US010930317B2

(12) United States Patent
Ogawa et al.

(10) Patent No.: US 10,930,317 B2
(45) Date of Patent: Feb. 23, 2021

(54) REPRODUCING APPARATUS, REPRODUCING METHOD, INFORMATION GENERATION APPARATUS, AND INFORMATION GENERATION METHOD

(71) Applicant: SONY CORPORATION, Tokyo (JP)

(72) Inventors: Kouji Ogawa, Tokyo (JP); Hirofumi Shimada, Kanagawa (JP); Yuta Murata, Kanagawa (JP); Masako Komuro, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/096,808

(22) PCT Filed: Feb. 24, 2017

(86) PCT No.: PCT/JP2017/007062
§ 371 (c)(1),
(2) Date: Oct. 26, 2018

(87) PCT Pub. No.: WO2017/203768
PCT Pub. Date: Nov. 30, 2017

(65) Prior Publication Data
US 2019/0139574 A1 May 9, 2019

(30) Foreign Application Priority Data
May 24, 2016 (JP) .................. 2016-103314

(51) Int. Cl.
*G11B 27/00* (2006.01)
*H04N 5/91* (2006.01)
(Continued)

(52) U.S. Cl.
CPC ...... *G11B 27/005* (2013.01); *G11B 20/00007* (2013.01); *G11B 27/34* (2013.01);
(Continued)

(58) Field of Classification Search
CPC .......... H04N 19/17; H04N 5/77; H04N 5/783; H04N 21/4325; H04N 5/772; H04N 5/232;
(Continued)

(56) References Cited

U.S. PATENT DOCUMENTS

2010/0220975 A1* 9/2010 Kondo ................. G11B 27/005
386/350
2011/0091107 A1* 4/2011 Sugihara ............... H04N 19/17
382/173
(Continued)

FOREIGN PATENT DOCUMENTS

CN 102045566 A 5/2011
CN 105578258 A 5/2016
(Continued)

OTHER PUBLICATIONS

Sep. 3, 2020, Chinese Office Action issued for related CN Application No. 201780030632.4.

*Primary Examiner* — Hung Q Dang
(74) *Attorney, Agent, or Firm* — Paratus Law Group, PLLC

(57) ABSTRACT

An attention position detection section detects an attention position of a user to a reproduction image of moving image data. Image-related information indicating a position of a virtual division area in which the reproduction image is virtually divided and an importance level of the virtual division area is associated with the moving image data. A reproduction control section determines the importance level of the virtual division area corresponding to the attention position detected by the attention position detection section and controls a reproduction operation of the moving image data in accordance with the determined importance level. For example, the reproduction control section sets a larger number of images to be thinned in the
(Continued)

reproduction operation as the importance level becomes lower so as to make the reproduction speed faster. The user can control the reproduction operation only by moving the attention position and easily perform the appropriate reproduction operation.

21 Claims, 24 Drawing Sheets

(51) Int. Cl.
*H04N 5/76* (2006.01)
*H04N 5/93* (2006.01)
*G11B 20/00* (2006.01)
*G11B 27/34* (2006.01)
*H04N 21/431* (2011.01)
*H04N 21/472* (2011.01)
*H04N 21/4728* (2011.01)

(52) U.S. Cl.
CPC .............. *H04N 5/76* (2013.01); *H04N 5/91* (2013.01); *H04N 5/93* (2013.01); *G11B 2020/00072* (2013.01)

(58) Field of Classification Search
CPC .......... H04N 9/8205; H04N 5/93; H04N 5/76; H04N 5/145; H04N 19/503; H04N 5/147; H04N 21/44008; H04N 9/8042; H04N 5/85; H04N 1/0044; H04N 19/129; H04N 7/181; H04N 5/23219; H04N 19/44; H04N 9/87; H04N 19/1883; G11B 27/105; G11B 27/322; G06F 3/011
USPC ................................. 386/239–262, 343–352
See application file for complete search history.

(56) References Cited

U.S. PATENT DOCUMENTS

| | | | | |
|---|---|---|---|---|
| 2011/0137753 | A1* | 6/2011 | Moehrle | G06Q 30/02 705/27.1 |
| 2013/0170559 | A1* | 7/2013 | Schink | H04N 19/107 375/240.25 |
| 2014/0168277 | A1* | 6/2014 | Ashley | G06T 3/20 345/672 |
| 2014/0285641 | A1* | 9/2014 | Kato | G06F 3/013 348/54 |
| 2016/0364878 | A1* | 12/2016 | Guo | G06K 9/6202 |

FOREIGN PATENT DOCUMENTS

| | | |
|---|---|---|
| JP | 2009-290567 A | 12/2009 |
| JP | 2010-074617 A | 4/2010 |
| JP | 2011-039797 A | 2/2011 |
| JP | 2011-223097 A | 11/2011 |
| JP | 2013-125191 A | 6/2013 |
| JP | 2014-050018 A | 3/2014 |
| JP | 2016-046642 A | 4/2016 |

\* cited by examiner

FIG. 3

| TIME CODE (HH:MM:SS:FF) | DIVISION AREA DEFINITION ID |
|---|---|
| 00:00:00:00 ~ 00:09:59:59 | DIVISION AREA DEFINITION 1 |
| 00:10:00:00 ~ END | DIVISION AREA DEFINITION 2 |

FIG. 4

| DIVISION AREA ID | AREA COORDINATES |
|---|---|
| A | (0,0),(0,2160),(960,2160),(960,0) |
| B | (961,0),(961,2160),(1920,2160),(1920,0) |
| C | (1921,0),(1921,2160),(2880,2160),(2880,0) |
| D | (2881,0),(2881,2160),(3840,2160),(3840,0) |

FIG. 6

| DIVISION AREA ID | AREA COORDINATES |
|---|---|
| A | (960,500),(960,1660),(2880,1660),(2880,500) |

FIG. 8

| TARGET | | IMPORTANCE-LEVEL DETERMINATION RULE | IMPORTANCE LEVEL |
|---|---|---|---|
| TIME CODE | DIVISION AREA ID | | |
| 00:00:00:00~ 00:09:59:59 | A, B, C, D | CASE IN WHICH A FRAME DIFFERENCE IS EQUAL TO OR GREATER THAN A THRESHOLD | 2 |
| 00:10:00:00~ END | A | CASE IN WHICH A PERSON IS DETECTED THROUGH FACE DETECTION | 3 |

FIG. 9

| TARGET | | IMPORTANCE-LEVEL DETERMINATION RULE | POINT |
|---|---|---|---|
| TIME CODE (HH:MM:SS:FF) | DIVISION AREA ID | | |
| 00:00:00:00~ 00:09:59:59 | A, B, C, D | CASE IN WHICH A FRAME DIFFERENCE IS EQUAL TO OR GREATER THAN A THRESHOLD | 2pt |
| 00:00:00:00~ 00:09:59:59 | A, B, C, D | CASE IN WHICH A PERSON IS DETECTED THROUGH FACE DETECTION | 3pt |
| 00:10:00:00~ END | A | CASE IN WHICH A PERSON IS DETECTED THROUGH FACE DETECTION | 2pt |
| 00:10:00:00~ END | A | CASE IN WHICH A CAR IS DETECTED (TEMPLATE MATCHING) | 1pt |

FIG. 10

| POINT TOTAL VALUE | IMPORTANCE LEVEL |
|---|---|
| 1pt OR SMALLER | 1 |
| 2 TO 4pt | 2 |
| 5pt OR GREATER | 3 |

FIG. 11

| TIME CODE (HH:MM:SS:FF) | A | B | C | D | OTHERS |
|---|---|---|---|---|---|
| 00:05:00:00~ 00:09:59:59 | 1 | 2 | 2 | 1 | 1 |
| 00:10:00:00~ END | 3 | — | — | — | 1 |

FIG. 14

| TARGET | | IMPORTANCE-LEVEL DIVISION AREA DETERMINATION RULE | IMPORTANCE LEVEL |
|---|---|---|---|
| TIME CODE (HH:MM:SS:FF) | 00:00:00:00~ 00:09:59:59 | AREA CONFORMING TO PATTERN A | 2 |
| | 00:00:00:00~ 00:09:59:59 | AREA CONFORMING TO PATTERN B | 1 |
| | 00:10:00:00~ END | AREA CONFORMING TO PATTERN C | 3 |

FIG. 18

| OPERATION | IMPORTANCE LEVEL OF KEYFRAME | KEYFRAME REPRODUCTION INTERVAL |
|---|---|---|
| FAST-FORWARD | 1 | THL |
| | 2 | THM (THM<THL) |
| | 3 | THS (THS<THM) |

FIG. 21

| IMPORTANCE LEVEL | KEYFRAME | | | | | | | | | |
|---|---|---|---|---|---|---|---|---|---|---|
| | KF1 | KF2 | KF3 | KF4 | KF5 | KF6 | KF7 | KF8 | KF9 | KF10 |
| 3 | ○ | ○ | ○ | ○ | ○ | ○ | ○ | ○ | ○ | ○ |
| 2 | ○ | — | ○ | — | ○ | — | ○ | — | ○ | — |
| 1 | ○ | — | — | ○ | — | — | ○ | — | — | ○ |

○ : KEYFRAME THAT IS REPRODUCED
— : KEYFRAME THAT IS NOT REPRODUCED

F I G. 2 4

| TIME CODE (HH:MM:SS:FF) | A | B | C | D | OTHERS |
|---|---|---|---|---|---|
| 00:00:00:00~ | ACTOR A | | ACTOR B | ACTOR C | |
| 00:10:00:00~ | ACTOR A | | ACTOR B | ACTOR C | |
| 00:20:00:00~ | | ACTOR A | ACTOR B, ACTOR C | | |
| 00:30:00:00~ | | ACTOR C | ACTOR B, ACTOR C | | |
| 00:40:00:00~ | | ACTOR C | ACTOR B | ACTOR A | |
| 00:50:00:00~ | | ACTOR C | ACTOR B | ACTOR A | |
| 00:60:00:00~ | | | ACTOR B | ACTOR A | |

FIG. 25

| AREA | TIME t1 | t2 | t3 | t4 | t5 | t6 | t7 | t8 | t9 | t10 |
|---|---|---|---|---|---|---|---|---|---|---|
| A | ACTOR A | | | | | | ACTOR B | ACTOR B | ACTOR B | ACTOR B |
| B | | | ACTOR A | | | | | | ACTOR A | ACTOR A |
| C | ACTOR B | ACTOR B | ACTOR B | ACTOR A | | | | ACTOR A | | |
| D | CAR X | CAR X | CAR X | CAR X | ACTOR A CAR X | ACTOR A CAR X | ACTOR A CAR X | CAR X | CAR X | CAR X |
| E | AIRPLANE Y | AIRPLANE Y | AIRPLANE Y | AIRPLANE Y | AIRPLANE Y | AIRPLANE Y | AIRPLANE Y | AIRPLANE Y | AIRPLANE Y | AIRPLANE Y |
| F | ANIMAL Z | ANIMAL Z | ANIMAL Z | ANIMAL Z | ANIMAL Z | ANIMAL Z | ANIMAL Z | ANIMAL Z | ANIMAL Z | ANIMAL Z |

↑ : REPRODUCTION
↑ (dashed) : FAST-FORWARD
⋯→ : ATTENTION AREA MOVEMENT OPERATION

● : REPRODUCTION START
◀ : TEMPORARY STOP
■ : STOP

REPRODUCING APPARATUS, REPRODUCING METHOD, INFORMATION GENERATION APPARATUS, AND INFORMATION GENERATION METHOD

CROSS REFERENCE TO PRIOR APPLICATION

This application is a National Stage Patent Application of PCT International Patent Application No. PCT/JP2017/007062 (filed on Feb. 24, 2017) under 35 U.S.C. § 371, which claims priority to Japanese Patent Application No. 2016-103314 (filed on May 24, 2016), which are all hereby incorporated by reference in their entirety.

TECHNICAL FIELD

The present technology relates to a reproducing apparatus, a reproducing method, an information generation apparatus, and an information generation method, and allows an appropriate reproduction control to be performed.

BACKGROUND ART

In the past, in a reproducing apparatus of moving image data, a reproduction operation (a fast-forward operation, a search operation) in which a reproduction speed is set to a speed faster than an ordinary speed has been allowed to be performed. In such a reproduction operation, for example, a frame is thinned in accordance with the reproduction speed and only a portion of frames are reproduced. Further, in PTL 1, to easily reproduce a desired scene, a scene mark is managed while being divided into a plurality of groups. The scene mark is allowed to be given so as not to be mixed between users.

CITATION LIST

Patent Literature

[PTL 1]
JP 2010-074617A

SUMMARY

Technical Problems

Meanwhile, in the reproduction of the moving image data, to perform a desired reproduction operation by the user, for example, an operation in which an operation button etc. for switching the reproduction operation from an operating section of the reproducing apparatus or a remote control apparatus are selected and operated needs to be repeated in each switching of the reproduction operation. Therefore, it is difficult to easily perform an appropriate reproduction operation. Further, in an apparatus that displays a reproduction image on a display section that is worn on the head, for example, in a head-mounted display apparatus or the like, it is difficult to view the operating section of the reproducing apparatus or the remote control apparatus. Accordingly, attachment and detachment of the display section or the like are necessary in order to perform the desired reproduction operation and the switching to the desired reproduction operation is further complicated.

To solve the above problems, an object of the present technology is to provide a reproducing apparatus, a reproducing method, an information generation apparatus, and an information generation method for easily performing an appropriate reproduction operation.

Solution to Problems

A first aspect of the present technology is directed to a reproducing apparatus including an attention position detection section configured to detect an attention position of a user to a reproduction image of moving image data, and a reproduction control section configured to determine an importance level of a virtual division area corresponding to the attention position detected by the attention position detection section on the basis of image-related information associated with the moving image data indicating a position and importance level of the virtual division area in which the reproduction image is virtually divided and control a reproduction operation of the moving image data in accordance with the determined importance level.

In the present technology, the attention position detection section is configured by a sensor that detects, for example, a direction of a head or a line-of-sight direction of the user who views the reproduction image of the moving image data. Further, the attention position detection section detects, as the attention position, the direction of the head or a position in a line-of-sight direction to the reproduction image on the basis of a detection result of the sensor. The image-related information indicating a position and importance level of the virtual division area in which the reproduction image is virtually divided is associated with the moving image data. The reproduction control section controls the reproduction operation of the moving image data in accordance with the importance level of the virtual division area corresponding to the detected attention position on the basis of the image-related information and a detection result of the attention position detection section. For example, the reproduction control section sets the next reproduction image by using time information of the reproduction image in accordance with the importance level of the virtual division area corresponding to the attention position. Then, the reproduction control section sets the next reproduction image so that as the importance level becomes lower, an image that is thinned in the reproduction operation is more present. Further, the moving image data is encoded data and the reproduction control section controls decoding processing of the moving image data in accordance with the importance level.

Further, the reproduction control section sets the information display area to the image display area corresponding to the virtual division area with a low importance level. In the case where area subject information regarding a subject included in the virtual division area is included in the image-related information, the reproduction control section displays the area subject information indicating the subject included in the virtual division area corresponding to the attention position detected by the attention position detection section. Further, in the case where the position and importance level of the virtual division area and the area subject information regarding the subject included in the virtual division area are indicated in each time by using the time information regarding the reproduction image in the image-related information, the reproduction control section associates the time, the subject, and the virtual division area on the basis of the image-related information to be displayed on the display section and controls the reproduction operation of the moving image data in accordance with a user selection result in the time and the virtual division area. Further, the reproduction control section may determine the virtual division area in which a desired subject is included on the basis of the area subject information and control the reproduction operation of the moving image data on the basis of a determination result. Further, in the case where the virtual division area in which the desired subject is included and the virtual division area corresponding to the attention position are different from each other, the reproduction control section proposes a position in the virtual division area in which the desired subject is included.

Further, the reproduction control section may display a reproduction operation history of the moving image data along with the image-related information on the display section. Further, the reproduction control section may store the reproduction operation history of the moving image data so as to be reused and, in the case where the moving image data is reproduced on the basis of the reproduction operation history, set the virtual division area corresponding to the attention position to a predetermined position in the reproduction image.

A second aspect of the present technology is directed to a reproducing method including detecting an attention position of a user to a reproduction image of moving image data by using an attention position detection section, and determining an importance level of a virtual division area corresponding to the attention position detected by using the attention position detection section and controlling a reproduction operation of the moving image data in accordance with the determined importance level by using a reproduction control section on the basis of image-related information associated with a position of the virtual division area in which the reproduction image is virtually divided and the moving image data indicating the importance level of the virtual division area.

A third aspect of the present technology is directed to an information generation apparatus including an image-related information generation section configured to set an importance level to each virtual division area in which an image of moving image data is virtually divided and generate image-related information indicating a position and importance level of the virtual division area in the image in association with the moving image data.

According to the present technology, the image-related information generation section sets the importance level to each virtual division area in which the image of the moving image data is virtually divided. The importance level is set on the basis of a processing result of image processing set to the virtual division area in each time or on the basis of the processing result of a plurality of image processing set to the virtual division area in each time. The image-related information generation section generates the image-related information indicating a relationship between the position and importance level of the virtual division area in the image of the moving image data in each time by using time information given to the image. In addition, the image-related information generation section may include the area subject information regarding the subject included in the virtual division area in the image-related information. Specific area recognition processing may be performed by using the image and the virtual division of the image may be performed on the basis of a recognition processing result.

A fourth aspect of the present technology is directed to an information generation method including setting an importance level to each virtual division area in which an image of moving image data is virtually divided and generating image-related information indicating a position and importance level of the virtual division area in the image in association with the moving image data by using an image-related information generation section.

Advantageous Effects of Invention

According to the present technology, the attention position of the user to the reproduction image of the moving image data is detected by using the attention position detection section. Further, on the basis of the image-related information associated with the moving image data indicating the position and importance level of the virtual division area in which the reproduction image is virtually divided, the importance level of the virtual division area corresponding to the attention position detected by the attention position detection section is determined and the reproduction operation of the moving image data is controlled in accordance with the determined importance level by using the reproduction control section. Therefore, the user can control the reproduction operation only by moving the attention position and easily perform an appropriate reproduction operation. Note that the effects described in the present specification are merely illustrative and are not limitative, and there may be additional effects that are not described in the present specification.

BRIEF DESCRIPTION OF DRAWINGS

FIG. 3 is a diagram illustrating a division area configuration information.

FIG. 4 is a diagram illustrating division area definition information corresponding to a division area definition 1.

FIG. 6 is a diagram illustrating the division area definition information corresponding to a division area definition 2.

FIG. 8 is a diagram illustrating importance-level definition information.

FIG. 9 is a diagram illustrating other importance-level definition information.

FIG. 10 is a diagram illustrating importance-level conversion information.

FIG. 11 is a diagram illustrating area importance-level information.

FIG. 14 is a diagram illustrating importance-level division area definition information.

FIG. 18 is a diagram illustrating operation setting information.

FIG. 21 is a diagram illustrating a relationship between the importance level of the virtual division area corresponding to an attention position and the keyframe in which the image data is acquired.

FIG. 24 is a diagram illustrating a GUI image.

FIG. 25 is a diagram illustrating a case in which a reproduction operation history is superimposed on image-related information for display.

DESCRIPTION OF EMBODIMENTS

Hereinafter, a mode for carrying out the present technology will be described. The description will be made in the following order.

1. Regarding Image Processing System
2. Configuration and Operations of Information Generation Apparatus
3. Another Configuration and Operations of Information Generation Apparatus
4. Configuration and Operations of Reproducing Apparatus
5. Other Operations of Reproducing Apparatus <1. Regarding Image Processing System>

Figure 1:
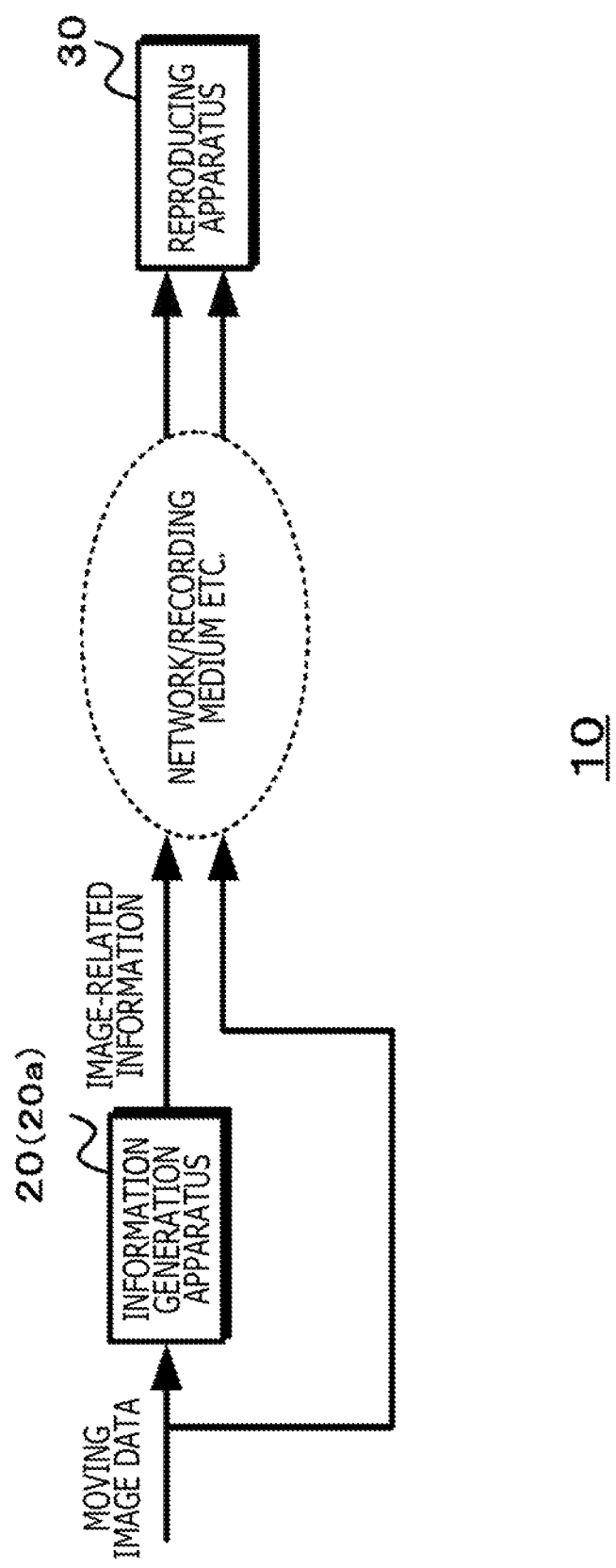
FIG. 1 is a diagram illustrating a configuration of an image processing system.

FIG. 1 illustrates a configuration of an image processing system. An information generation apparatus 20 of an image processing system 10 generates image-related information associated with moving image data. The image-related information has area importance-level information. The area importance-level information indicates a position and importance level of each virtual division area into which an image to be reproduced is virtually divided. Further, the image-related information may have area subject information indicating a subject included in the virtual division area. Note that the association means that the image-related information just has to be usable at the time of reproducing the moving image data. Further, the association means that the image-related information is included in a file of the moving image data, a file of the moving image data and a file of the image-related information is recorded in the same recording medium, the image-related information can be acquired through a communication path from a provision source of the image-related information indicated by, for example, accessory information of the moving image data, or the like.

A reproducing apparatus 30 controls a reproduction operation on the basis of the image-related information associated with the moving image data. For example, the reproducing apparatus 30 controls a reproduction speed in accordance with the importance level of the virtual division area corresponding to an attention position of the user to a reproduction image at a special reproduction operation time of performing reproduction at a speed different from an ordinary speed. This process permits an appropriate reproduction operation to be easily performed.

Hereinafter, a configuration and operations of the information generation apparatus 20 will be described and it is revealed that the image-related information associated with the moving image data is what kind of information. Then, a configuration and operations of the reproducing apparatus 30 that performs the reproduction of the moving image data by using the image-related information will be described.

<2. Configuration and Operations of Information Generation Apparatus>

Figure 2:
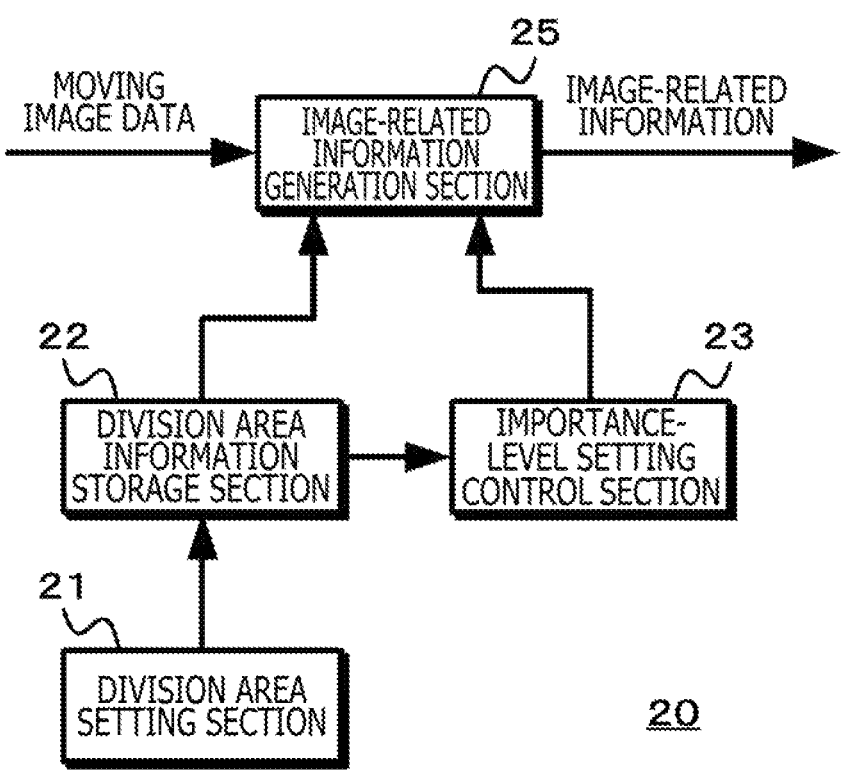
FIG. 2 is a diagram illustrating a configuration of an information generation apparatus.

FIG. 2 illustrates a configuration of the information generation apparatus. The information generation apparatus 20 has a division area setting section 21, a division area information storage section 22, an importance-level setting control section 23, and an image-related information generation section 25.

The division area setting section 21 sets the virtual division area to each image of the moving image data and generates division area information indicating a setting state of the virtual division area. Further, the division area setting section 21 allows the division area information storage section 22 to store the division area information. The division area setting section 21 virtually divides an image as the division area information, for example, in accordance with a division instruction operation by an image-related information provider. Further, the division area setting section 21 generates division area configuration information and division area definition information on the basis of division results. The division area configuration information is information indicating a definition of the virtual division area set to each image of the moving image data. Further, the division area definition information is information indicating that a definition indicated by the division area configuration information is under what kind of virtual division conditions.

The division area setting section 21 generates as the division area configuration information, for example, information indicating a division area definition ID in each time by using a time code given to each image of the moving image data. FIG. 3 illustrates the division area configuration information. In the case where the time code indicates a period of "00:00:00:00 to 00:09:59:59," the division area configuration information indicates that a "division area definition 1" is used as the division area definition ID. Further, in the case where the time code indicates the period of "00:10:00:00 to END," the division area configuration information indicates that a "division area definition 2" is used as the division area definition ID.

Figure 5:
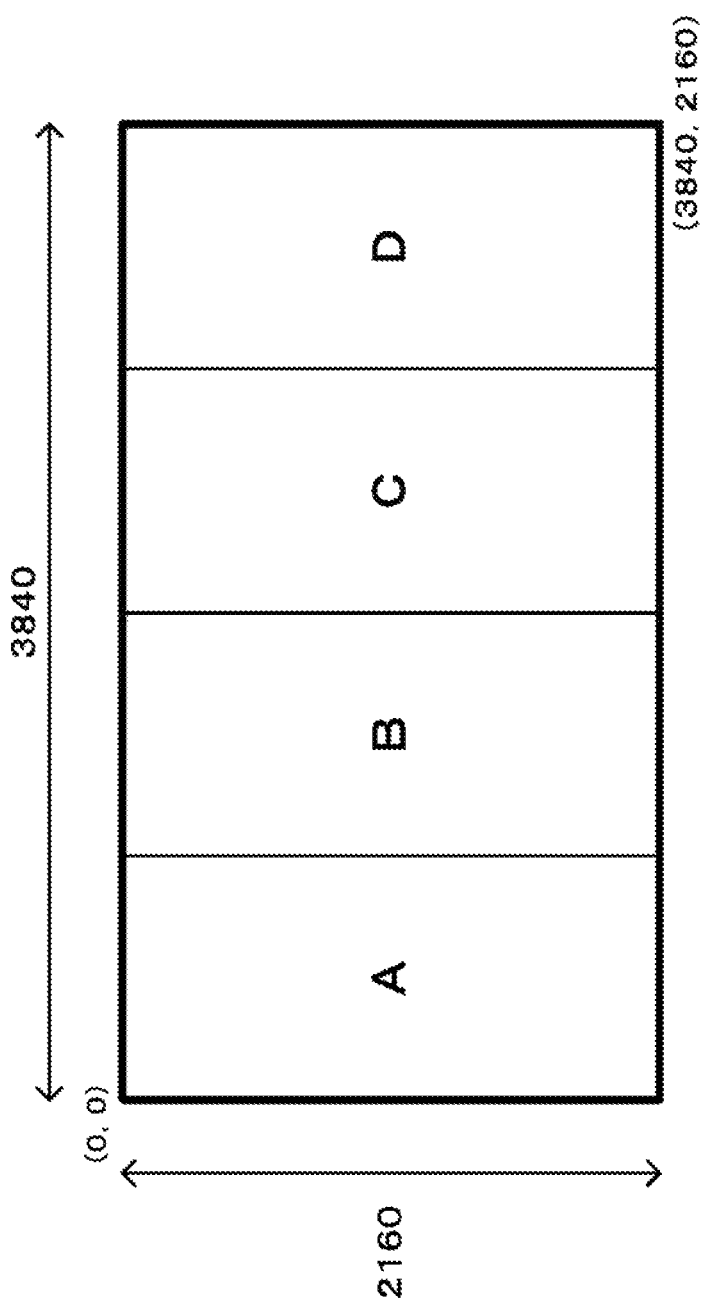
FIG. 5 is a diagram illustrating a virtual division condition corresponding to the division area definition 1.

The division area setting section 21 generates as the division area configuration information, for example, information obtained by representing the division area ID and area coordinates indicating a position in an image in the virtual division area indicated by the division area ID. FIG. 4 illustrates the division area definition information corresponding to the division area definition 1. FIG. 5 illustrates the virtual division conditions corresponding to the division area definition 1. The division area definition 1 indicates that four virtual division areas are provided and "A to D" are set as the division area ID to the four virtual division areas. Further, it is indicated that the virtual division area in which the division area ID is, for example, "A" is an area surrounded by the area coordinates "(0, 0), (0, 2160), (960, 2160), and (960, 0)." Similarly, the division area definition information indicates the area coordinates also in the virtual division areas in which the division area ID is "B to D."

Figure 7:
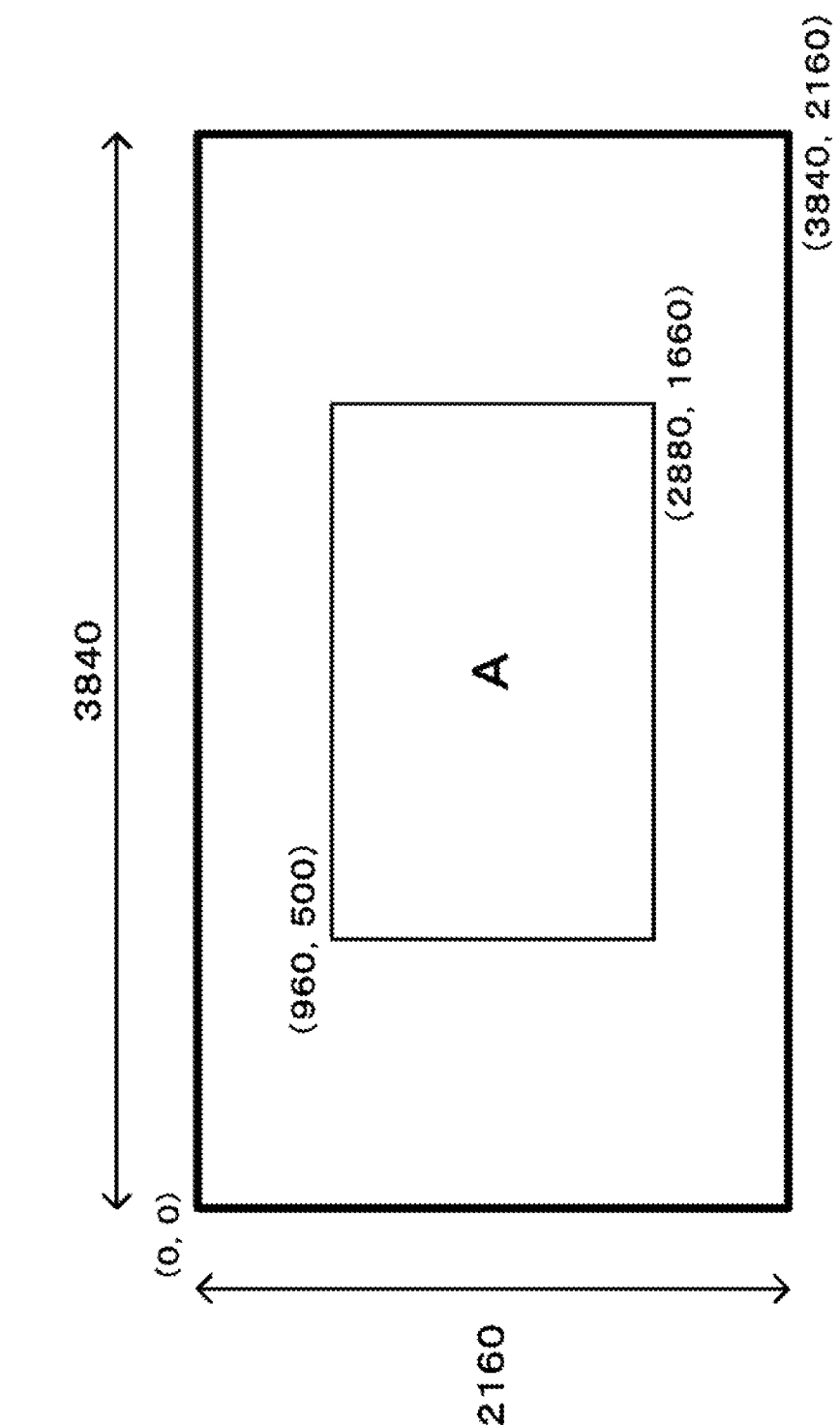
FIG. 7 is a diagram illustrating the virtual division condition corresponding to the division area definition 2.

FIG. 6 illustrates the division area definition information corresponding to the division area definition 2. Further, FIG. 7 illustrates the virtual division conditions corresponding to the division area definition 2. In the division area definition 2, it is indicated that the virtual division area is provided in the center of a screen and "A" is set to the virtual division area as the division area ID. Further, it is indicated that the virtual division area in which the division area ID is "A" is an area surrounded by the area coordinates "(960, 500), (960, 1660), (2880, 1660), and (2880, 500)." Note that an area in which the division area ID is not set is subjected to the virtual division area falling into "others" as described below.

The division area information storage section 22 stores the division area information generated by the division area setting section 21. Further, the division area information storage section 22 outputs the stored division area information to the importance-level setting control section 23 and the image-related information generation section 25.

The importance-level setting control section 23 generates an importance-level determination rule for the virtual division area indicated by the division area information and importance-level definition information indicating the importance level assigned in accordance with a determination result using the importance-level determination rule. The importance-level setting control section 23 defines the importance level assignable to the virtual division area. The importance-level setting control section 23 defines a plurality of levels as the importance level, for example, a level such as "1 (low level), 2 (middle level), and 3 (high level)." Further, the importance-level setting control section 23 sets the importance-level determination rule for determining which level of the defined importance level is assigned to the virtual division area. In the importance-level determination rule, image processing is performed by using the moving image data in the virtual division area and an assignment of the importance level is performed in accordance with image processing results by the image-related information generation section 25 described below. In the image processing, for example, a frame difference for determining whether a moving movable body is included in the virtual division area is calculated. In addition, in the image processing, template matching for determining whether a predetermined particular-shape template image (e.g., a template face image) is included in the virtual division area is performed. Note that the definition of the importance level or the importance-level determination rule may be set in advance. Alternatively, the image-related information provider may be able to set the definition of the importance level or the importance-level determination rule. Further, the image-related information provider may be able to select the definition of the importance level, the importance-level determination rule, or the like in accordance with the reproduction operation.

Further, in the case where the assignment of the importance level is performed on the basis of a plurality of importance-level determination rules, the importance-level setting control section 23 may allow, for example, points to be set to each of the importance-level determination rules. Further, the importance-level setting control section 23 may allow the importance level to be assigned from a point total value of each of the importance-level determination rules.

FIG. 8 illustrates the importance-level definition information. In the importance-level definition information, the target, the importance-level determination rule, and the importance level are indicated. The target is the virtual division area in each image indicated by the division area information and the importance-level determination rule indicates image processing performed by using the image in the virtual division area. Further, the importance level indicates an importance level assigned to the virtual division area in the case of satisfying the importance-level determination rule. For example, in the time code indicating the period of "00:00:00:00 to 00:09:59:59," the frame difference is calculated in the virtual division area in which the division area ID is "A to D," and the importance level "2" is assigned to the virtual division area in which a difference amount is equal to or greater than a threshold. Further, in the time code indicating the period of "00:10:00:00 to END," it is determined whether a person is detected on the basis of a face detection to the virtual division area in which the division area ID is "A." If the person is detected, the importance level "3" is assigned to the virtual division area. Note that an illustration is not performed in the figure; however, if the importance-level determination rule is not satisfied, the importance level "1" is assigned.

FIG. 9 illustrates other importance-level definition information. In the importance-level definition information, the targets, the plurality of importance-level determination rules, and the points are indicated. The target indicates the virtual division area in each image indicated by the division area information and the importance-level determination rule indicates the image processing performed by using the image in the virtual division area. Further, the point indicates the number of points acquired in the case of satisfying the importance-level determination rule. For example, in the virtual division area in which in the period in which the time code indicates "00:00:00:00 to 00:09:59:59," the frame difference is calculated in the virtual division areas in which the division area ID is "A to D" and if the difference amount is equal to or greater than the threshold, the point "2pt" is allowed to be acquired. Further, in the virtual division area in which in the period in which the time code indicates "00:00:00:00 to 00:09:59:59," it is determined whether the person is detected on the basis of the face detection in the virtual division areas in which the division area is "A to D," and if the person is detected, the point "3pt" is allowed to be acquired.

In the case in which in the period in which the time code indicates "00:10:00:00 to END," it is determined whether the person is detected on the basis of the face detection in the virtual division area in which the division area ID is "A," and if the person is detected, the point "2pt" is allowed to be acquired in the virtual division area. Further, it is determined whether in the period in which the time code indicates "00:10:00:00 to END," a car is detected on the basis of the template matching in the virtual division area in which the division area ID is "A." Here, if the car is detected, the point "1pt" is allowed to be acquired in the virtual division area. Note that if the importance-level determination rule is not satisfied, the point is disabled from being acquired.

Further, in the case where the assignment of the importance level is performed on the basis of the acquired point, importance-level conversion information is set to the importance-level definition information. FIG. 10 illustrates the importance-level conversion information. In the importance-level conversion information, the importance level assigned in accordance with the point total value in each virtual division area is indicated. For example, the assignment of the importance level "1" is performed to the virtual division area in which the point total value is "1pt or smaller." Further, the assignment of the importance level "2" is performed to the virtual division area in which the point total value is "2 to 4pt" and the assignment of the importance level "3" is performed to the virtual division area in which the point total value is "5pt or greater."

As described above, the importance-level setting control section 23 generates the importance-level definition information indicating the importance-level determination rule and the assignable importance level in the virtual division area in each image represented by the division area information acquired from the division area information storage section 22 and outputs the importance-level definition information to the image-related information generation section 25.

The image-related information generation section 25 performs the image processing indicated by the importance-level determination rule on the virtual division area in each image of the moving image data on the basis of the division area information stored in the division area information storage section 22 and the importance-level definition information generated by the importance-level setting control section 23. Further, the image-related information generation section 25 performs the assignment of the importance level in accordance with processing results of the image processing indicated by the importance-level determination rule. Further, the image-related information generation section 25 generates the area importance-level information indicating the importance level of each virtual division area indicated by the division area information. FIG. 11 illustrates the area importance-level information. For example, in the period in which the time code indicates "00:00:00:00 to 00:09:59:59," the importance level "1" is assigned to the virtual division areas in which the division area ID is "A" and "D." Further, the importance level "2" is assigned to the virtual division areas in which the division area ID is "B" and "C." Further, in the period in which the time code indicates "00:10:00:00 to END," the importance level "3" is assigned to the virtual division area in which the division area ID is "A." Note that an area of "others" is the virtual division area that is not defined by the division area definition information and the importance level "1" is assigned thereto.

The image-related information generation section 25 outputs the image-related information indicating the division area information and the area importance-level information in association with the moving image data. Further, the image-related information generation section 25 may perform a subject recognition etc. to the virtual division area in each image. Further, the image-related information generation section 25 may generate the area subject information indicating information regarding the subject included in the virtual division area. Further, the image-related information generation section 25 may enable the image-related information provider to input the information regarding the subject. The image-related information generation section 25 includes the generated area subject information in the image-related information for output.

Figure 12:
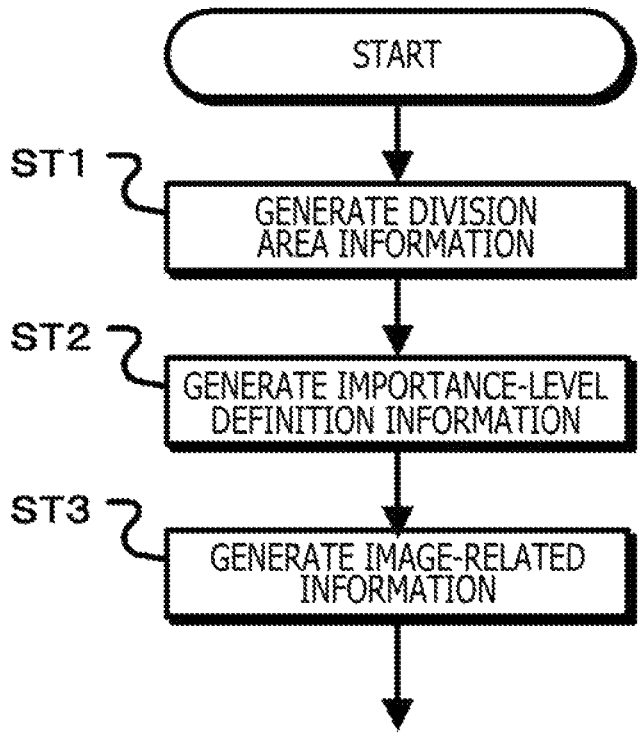
FIG. 12 is a flowchart illustrating operations of the information generation apparatus.

FIG. 12 is a flowchart illustrating operations of the information generation apparatus. In step ST1, the information generation apparatus generates the division area information. The division area setting section 21 of the information generation apparatus 20 generates the division area information indicating a setting state of the virtual division area in each image. Then, the process proceeds to step ST2.

In step ST2, the information generation apparatus generates the importance-level definition information. The importance-level setting control section 23 of the information generation apparatus 20 generates the importance-level definition information indicating the importance level assigned in accordance with the importance-level determination rule to the virtual division area and the determination results. Then, the process proceeds to step ST3.

In step ST3, the information generation apparatus generates the image-related information. The image-related information generation section 25 of the information generation apparatus 20 performs the image processing on the moving image data on the basis of the importance-level determination rule indicated by the importance-level definition information generated in step ST2. Further, the image-related information generation section 25 assigns the importance level to the virtual division area in accordance with the processing results. Further, the image-related information generation section 25 generates the image-related information indicating the importance level assigned to the division area information generated in step ST1 and the virtual division area indicated by the division area information. Further, the image-related information generation section 25 outputs the image-related information in association with the moving image data.

As described above, the information generation apparatus generates the image-related information indicating setting conditions of the virtual division area in each image and the importance level of the virtual division area on the basis of the setting operations of the image-related information provider and the moving image data. Further, the information generation apparatus outputs the image-related information in association with the moving image data. Note that the area importance-level information included in the image-related information is not limited to a case in which the area importance-level information is composed of importance-level setting information and the division area information composed of the division area configuration information and the division area definition information. For example, information indicated by the division area configuration information, the division area definition information, and the importance-level setting information may be collectively composed as one group.

<3. Another Configuration and Operations of Information Generation Apparatus>

Next, the information generation apparatus that allows setting of the virtual division area to be automatically performed will be described as another configuration and operations of the information generation apparatus.

Figure 13:
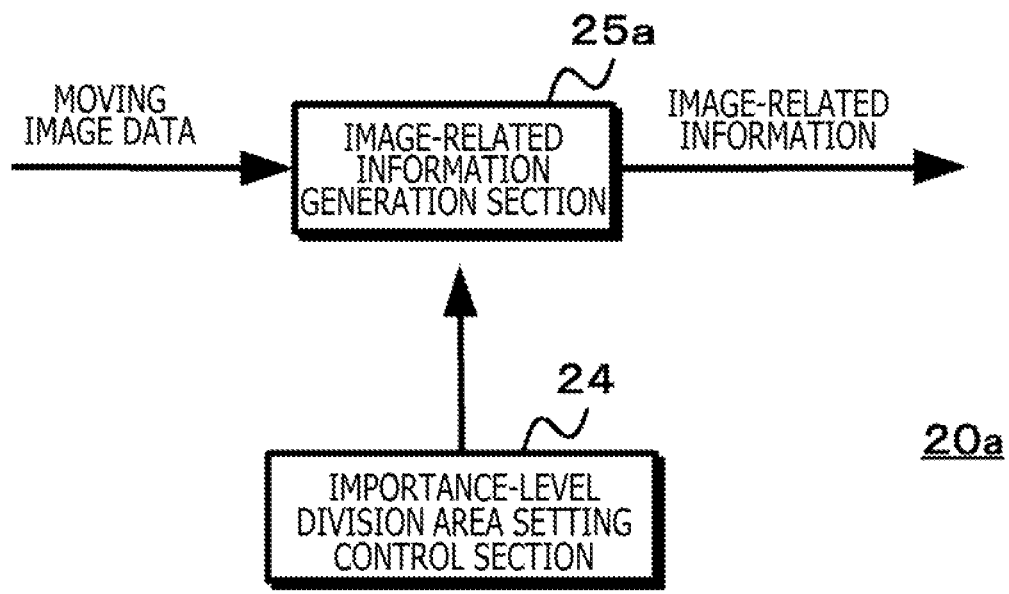
FIG. 13 is a diagram illustrating another configuration of the information generation apparatus.

FIG. 13 illustrates another configuration of the information generation apparatus. An information generation apparatus 20*a* has an importance-level division area setting control section 24 and an image-related information generation section 25*a*.

The importance-level division area setting control section 24 sets an importance-level division area definition information. The importance-level division area definition information indicates the area determination rule for performing an area division and the importance level that is assigned to the virtual division area virtually divided by the area division. The area determination rule is information indicating specific area recognized by the image processing, for example, pattern matching or the like. The importance level indicates, for example, levels of 1 (low), 2 (middle), 3 (high), and the like. Note that the importance-level division area definition information may be set in advance to the information generation apparatus and the image-related information provider may perform a change or addition of the importance-level division area definition.

FIG. 14 illustrates the importance-level division area definition information. In the importance-level division area definition information, the target, the area determination rule, and the importance level are indicated. The target indicates a time of the image and the area determination rule indicates the image processing that is performed by using the image based on the moving image data. Further, the importance level indicates an importance level that is assigned to the virtual division area in which the area determination rule is satisfied. For example, in the period in which the time code indicates "00:00:00:00 to 00:09:59:59," a detection in the area conforming to a pattern A and a detection in the area conforming to a pattern B are performed as the recognition processing in the specific area. Here, the assignment of the importance level "2" is performed as the virtual division area "A" to the area conforming to the pattern A. Further, the assignment of the importance level "1" is performed as the virtual division area "B" to the area conforming to the pattern B. In addition, in the period in which the time code indicates "00:10:00:00 to END," the detection in the area conforming to a pattern C is performed as the recognition processing in the specific area. Further, the assignment of the importance level "3" is performed as the virtual division area "C" to the area conforming to the pattern C. Meanwhile, an illustration is not performed in the figure; further, the assignment of the importance level "1" is performed to the area in which the importance-level division area determination rule is not satisfied.

The image-related information generation section 25a performs the recognition processing on the specific area indicated by the area determination rule in each image of the moving image data on the basis of the importance-level division area definition information generated by the importance-level division area setting control section 24. Further, the image-related information generation section 25a performs the area division in accordance with a recognition processing result in the specific area. Further, the image-related information generation section 25a assigns the importance level to the virtual division area. Further, the image-related information generation section 25a generates the division area information based on the area division according to the recognition processing result in the specific area and the area importance-level information indicating the importance level of the virtual division area indicated by the division area information. Further, the image-related information generation section 25a outputs, as the image-related information, the division area information and the area importance-level information in association with the moving image data. Further, the image-related information generation section 25a may perform a subject recognition etc. in the virtual division area in each image. Further, the image-related information generation section 25a may generate the area subject information indicating the information regarding the subject included in the virtual division area. Further, the image-related information generation section 25a may enable the image-related information provider to input the information regarding the subject. The image-related information generation section 25a includes the generated area subject information in the image-related information for output.

Figure 15:
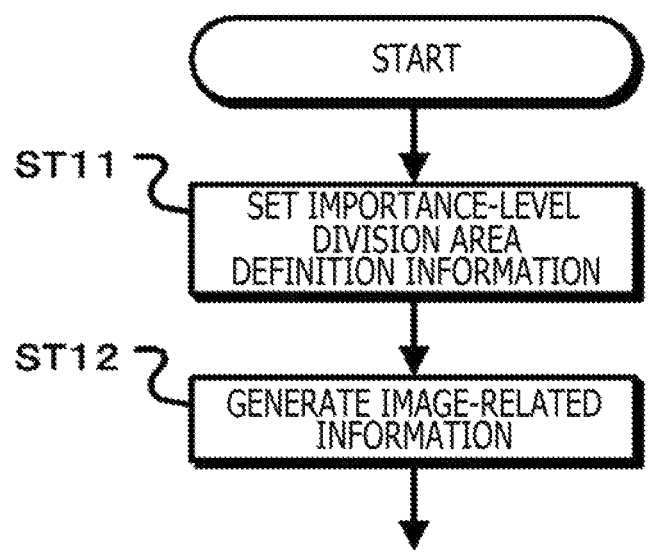
FIG. 15 is a flowchart illustrating other operations of the information generation apparatus.

FIG. 15 is a flowchart illustrating other operations of the information generation apparatus. Further, FIG. 16 is a diagram describing other operations of the information generation apparatus.

In step ST11, the information generation apparatus sets the importance-level division area definition information. The importance-level division area setting control section 24 of the information generation apparatus 20 sets the importance-level division area definition information indicating the area determination rule for performing the area division and the importance level assigned to the virtual division area virtually divided by the area division. Then, the process proceeds to step ST12.

Figure 16:
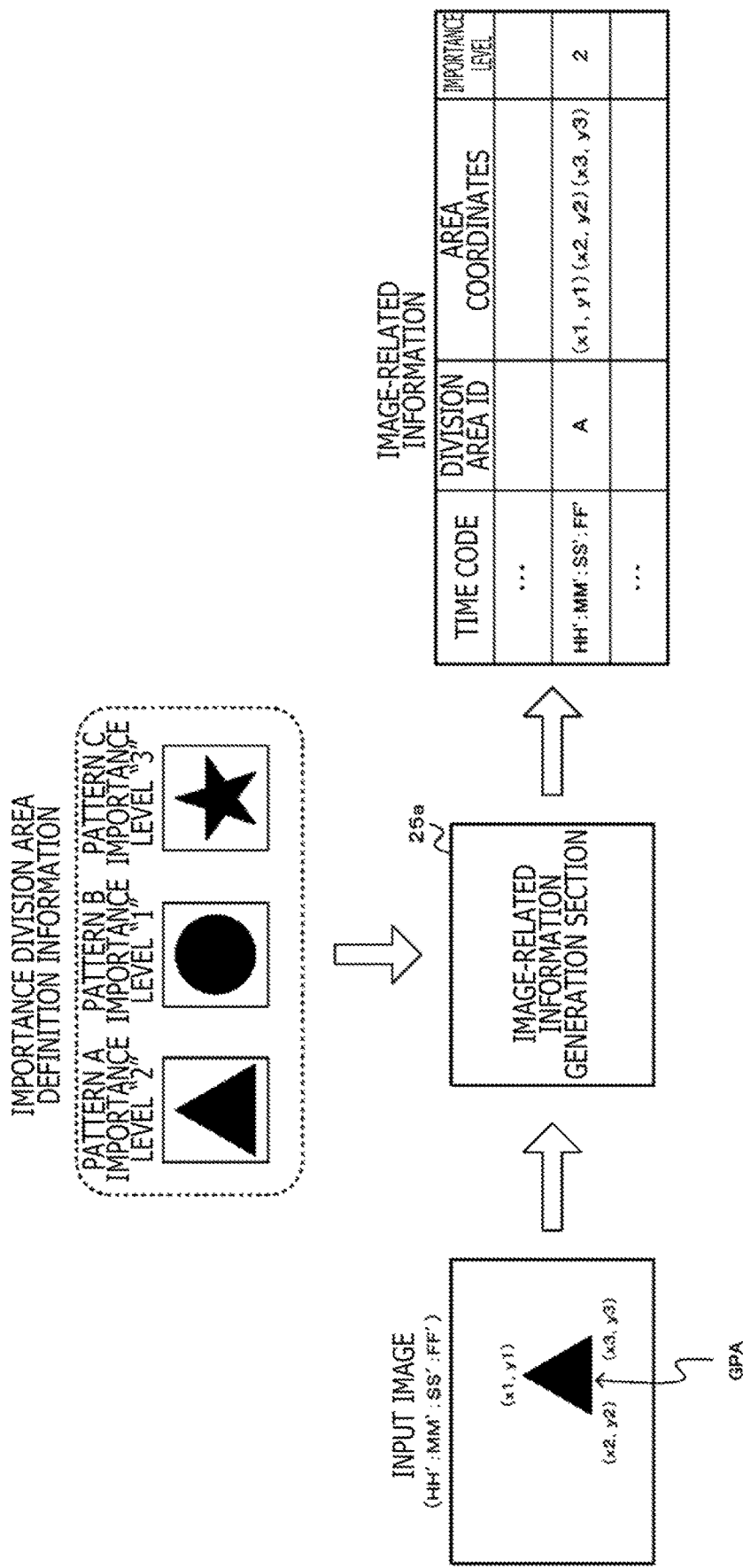
FIG. 16 is a diagram describing other operations of the information generation apparatus.

In FIG. 16, it is illustrated that on the basis of the importance-level division area definition information, the importance level "2" is assigned to the virtual division area conforming to the pattern A, the importance level "1" is assigned to the virtual division area conforming to the pattern B, and the importance level "3" is assigned to the virtual division area conforming to the pattern C.

In step ST12, the information generation apparatus generates the image-related information. The image-related information generation section 25a of the information generation apparatus 20 performs the image processing on the moving image data on the basis of the area determination rule indicated by the importance-level division area definition information generated in step ST11. Further, the image-related information generation section 25a performs the assignment of the importance level to the area division and the virtual division area virtually divided by the area division on the basis of the image processing results. Further, the image-related information generation section 25a generates the division area information and the area importance-level information indicating the importance level of the virtual division area indicated by the division area information on the basis of the area division according to the processing result of the image processing. Further, the image-related information generation section 25a outputs, as the image-related information, the division area information and the area importance-level information in association with the moving image data.

In FIG. 16, in the case where an area GPA surrounded by coordinates (x1, y1), (x2, y2), and (x3, y3) in the input image of the time code "HH':MM':SS':FF'" is the area conforming to the pattern A, the area GPA is the area conforming to the pattern A, for example, as the virtual division area of the division area ID "A," and the importance level "2" is assigned to the area GPA. Accordingly, on the basis of the image-related information generated by the image-related information generation section 25a, in the time code "HH': MM':SS':FF'," it is indicated that an area of the division area ID "A" is an area surrounded by the coordinates (x1, y1), (x2, y2), and (x3, y3) and the importance level is "2."

Such processing is performed by the information generation apparatus, and thereby the assignment of the importance level to the area division and the virtual division area is automatically enabled on the basis of the importance-level division area definition information.

Note that, in the information generation apparatus 20 (20a), in the case where the moving image data is, for example, a synthetic image having a wide angle of view in which images captured by a plurality of image pickup apparatuses are joined and generated, an image capturing range of each image pickup apparatus may be used as the virtual division area. In this case, the image capturing range of each image pickup apparatus and the image area of the synthetic image can be associated with each other. Therefore, before each captured image is synthesized, the assignment of the importance level is performed to each virtual division area and the division area information can be generated in accordance with synthesis processing.

<4. Configuration and Operations of Reproduction Apparatus>

Next, the configuration and operations of the reproducing apparatus that reproduces the moving image data will be described. In the case of performing a special reproduction to be reproduced at a speed different from the ordinary speed by using the moving image data, the reproducing apparatus 30 illustrated in FIG. 1 controls the reproduction operation on the basis of the image-related information associated with the moving image data. Note that in the following descriptions, a case in which the moving image data is encoded data is illustrated.

Figure 17:
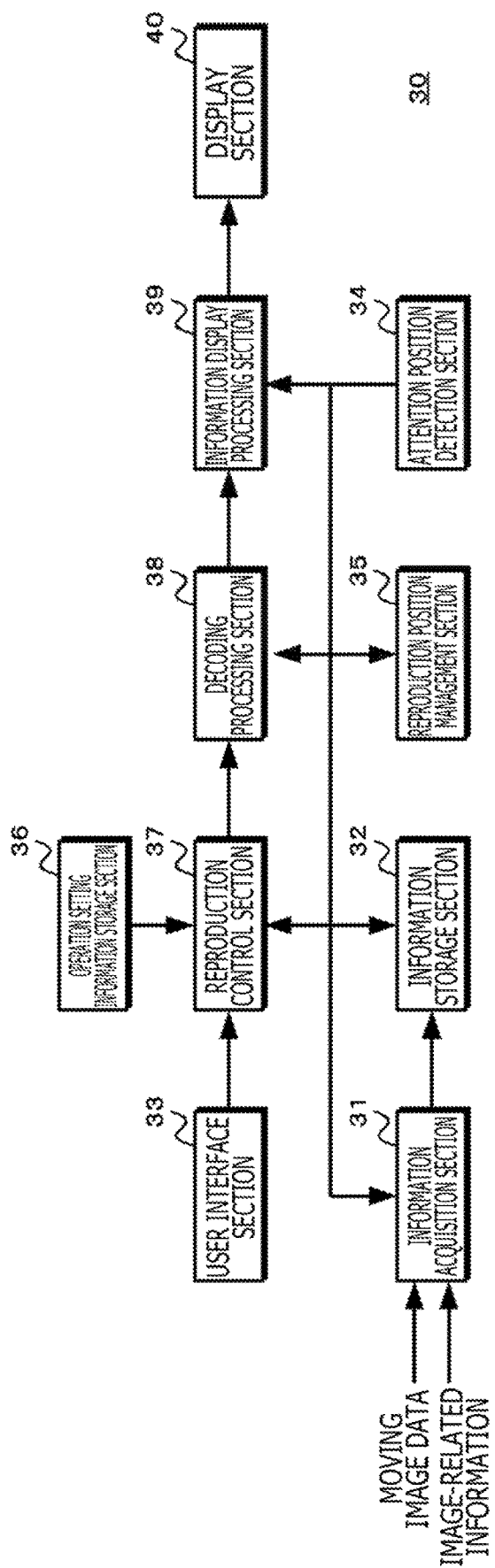
FIG. 17 is a diagram illustrating a configuration of a reproducing apparatus.

FIG. 17 illustrates the configuration of the reproducing apparatus. The reproducing apparatus 30 has an information acquisition section 31, an information storage section 32, a user interface section 33, an attention position detection section 34, a reproduction position management section 35, an operation setting information storage section 36, a reproduction control section 37, a decoding processing section 38, an information display processing section 39, and a display section 40. Note that the display section 40 may be configured separately from the reproducing apparatus 30.

The information acquisition section 31 acquires the moving image data and the image-related information associated with the moving image data. The information acquisition section 31 acquires the moving image data and the image-related information from external equipment through the communication path on the basis of an instruction from the reproduction control section 37. Further, the information acquisition section 31 may acquire the moving image data and the image-related information from a recording medium on the basis of the instruction from the reproduction control section 37. The information acquisition section 31 allows the information storage section 32 to store the acquired moving image data and image-related information.

The information storage section 32 stores the moving image data and image-related information acquired by the information acquisition section 31. The moving image data and image-related information stored in the information storage section 32 are read out by the reproduction control section 37.

The user interface section 33 receives an operation of the user who uses the reproducing apparatus and outputs an operation signal according to the user operation to the reproduction control section 37.

The attention position detection section 34 is provided with a head tracking sensor such as an acceleration sensor or a gyro sensor. The attention position detection section 34 detects a movement of the head of the user and determines a position in a direction of the head to the reproduction image to be the attention position of the user. Further, the attention position detection section 34 may be provided with an image pickup section that captures the eyeballs. The attention position detection section 34 may detect the line-of-sight direction of the user on the basis of a movement of the eyes (pupils) detected from the image acquired by the image pickup section. Further, the attention position detection section 34 may determine the position in the line-of-sight direction to the reproduction image to be the attention position of the user. The attention position detection section 34 outputs attention position detection results indicating the determined attention position to the reproduction control section 37.

The reproduction position management section 35 stores, as reproduction position information, a frame number or time code of the moving image data that is subjected to decoding processing by the decoding processing section 38. Further, in the case where the encoded data includes a two-way prediction coded image, a decoding order and display order of the frame image are different from each other. Therefore, the reproduction position management section 35 may detect the attention position as described below by using images in the display order. Further, the reproduction position management section 35 may add a display time code to the reproduction position information so that the image data of the keyframe can be acquired in accordance with the importance level of the virtual division area corresponding to the detected attention position. The reproduction position information stored in the reproduction position management section 35 is read out by the reproduction control section 37.

The operation setting information storage section 36 stores the operation setting information including information for performing an operation according to the importance level indicated by the image-related information at the time of the special reproduction operation. The operation setting information may be stored in advance in the operation setting information storage section 36. Further, the user may operate the user interface section 33 and perform an input, a change, or the like of the operation setting information. The operation setting information stored in the operation setting information storage section 36 is read out by the reproduction control section 37.

FIG. 18 illustrates the operation setting information. For example, in the case where the special reproduction operation is a fast-forward operation, the keyframe reproduction interval according to the importance level is set in the operation setting information. Note that in the case where the moving image data is the encoded data, the keyframe is set to a frame in an intra image so that the decoding processing can be performed without using the frame image at a different time. In addition, although not illustrated in the figure, time code information for specifying the keyframe as a reproduction candidate, information regarding the frame number, or the like may be used as the operation setting information.

For example, if the importance level is "1," the keyframe reproduction interval is set so that the keyframe is reproduced at a frame interval "THL." Further, if the importance level is "2," the keyframe reproduction interval is set so that the keyframe is reproduced at a frame interval "THM (<THL)." Further, if the importance level is "3," the keyframe reproduction interval is set so that the keyframe is reproduced at a frame interval "THS (<THM)."

The reproduction control section 37 controls each section on the basis of the operation signal from the user interface section 33 so that an operation according to the user operation is performed in the reproducing apparatus. Further, the reproduction control section 37 determines the importance level of the virtual division area corresponding to the attention position detected by the attention position detection section 34 on the basis of the image-related information. Further, the reproduction control section 37 controls the reproduction operation of the moving image data in accordance with the determined importance level. For example, in the case of performing the special reproduction operation, the reproduction control section 37 controls a readout of the moving image data from the information storage section 32 in accordance with the importance level of the virtual division area corresponding to the attention position of the user on the basis of the image-related information, the attention position detection results, the operation setting information, and the like. The reproduction control section 37 outputs the read-out moving image data to the decoding processing section 38. In addition, the reproduction control section 37 may control an operation of the decoding processing section as control of the reproduction operation.

The decoding processing section 38 performs the decoding processing on the moving image data read out by the reproduction control section 37. Further, the decoding processing section 38 outputs the image data obtained by performing the decoding processing of the moving image data to the information display processing section 39. Further, the decoding processing section 38 may switch the decoding processing in accordance with the instruction from the reproduction control section 37.

The information display processing section 39 generates display data such as supplementary information related to a menu image, a GUI (Graphical User Interface) image, an advertising image, and the moving image data. Further, the information display processing section 39 outputs the display data along with the image data provided from the decoding processing section 38 to the display section 40. The information display processing section 39 may superimpose an image such as a menu or the GUI on a reproduction image obtained by decoding the moving image data to generate output data and output the output data to the display section 40. Further, the information display processing section 39 may generate output data for displaying the image such as the menu or the GUI in an area different from the reproduction image and output the output data to the display section 40. In addition, the information display processing section 39 may set the information display area in the virtual division area with a low importance level. Further, the information display processing section 39 may generate the output data in which various pieces of information are displayed in the information display area to output the output data to the display section 40. The display section 40 displays an image such as the reproduction image of the moving image data, supplementary information related to the moving image data, the menu, or the GUI on the basis of the output data from the information display processing section 39.

Figure 19:
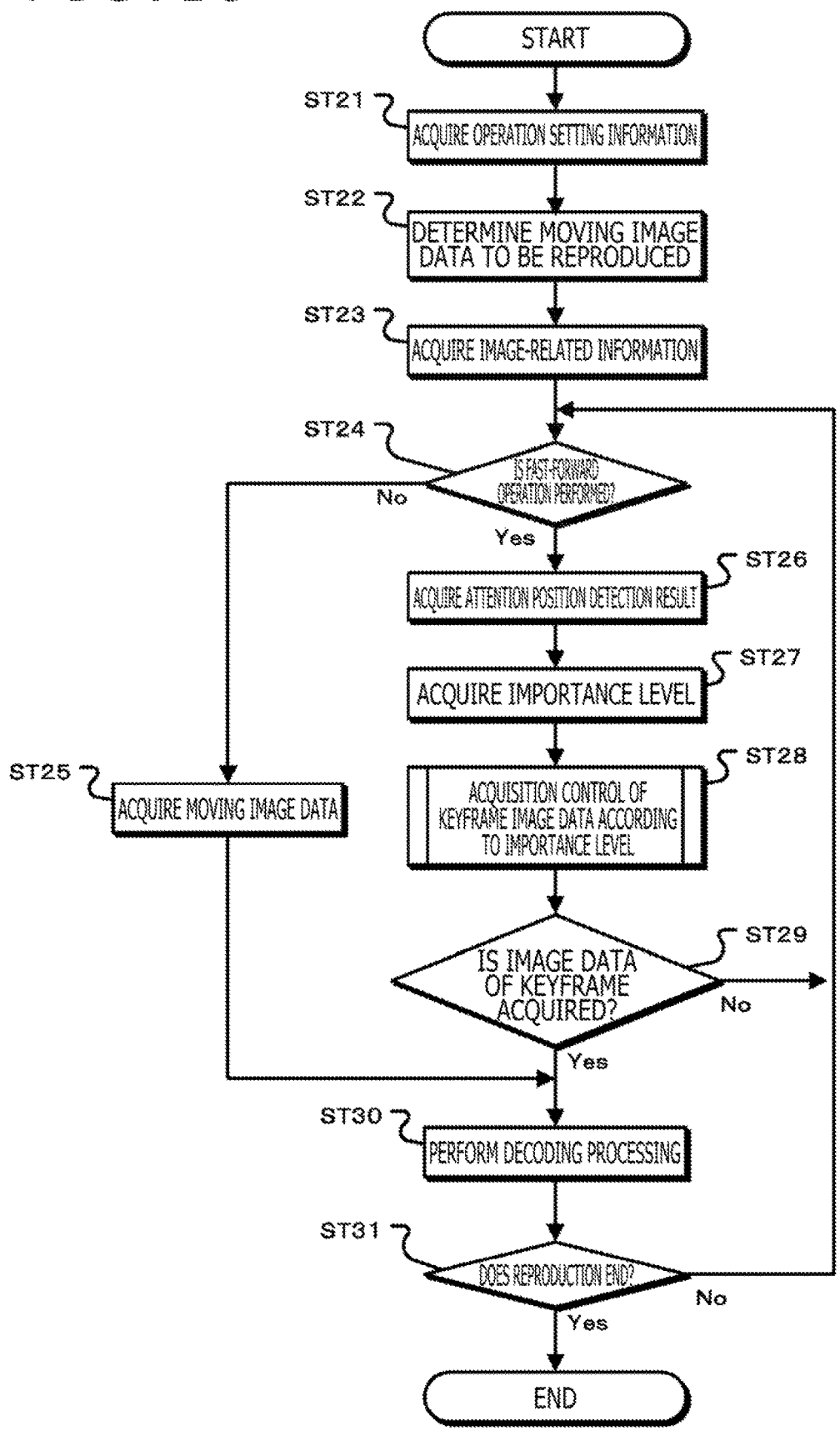
FIG. 19 is a flowchart illustrating operations of the reproducing apparatus.

FIG. 19 is a flowchart illustrating operations of the reproducing apparatus. In the reproducing apparatus 30, the moving image data is stored in the information storage section 32. Further, in the reproducing apparatus 30, the operation setting information including information for performing an operation according to the importance level indicated in the image-related information at the time of the special reproduction operation is stored in the operation setting information storage section 36.

In step ST21, the reproducing apparatus acquires the operation setting information. The reproduction control section 37 of the reproducing apparatus 30 acquires the operation setting information from the operation setting information storage section 36 and performs the setting of the reproduction operation. Then, the process proceeds to step ST22.

In step ST22, the reproducing apparatus determines the moving image data to be reproduced. The reproduction control section 37 of the reproducing apparatus 30 allows, for example, the display section 40 to display a list of reproducible moving image data. Further, the reproduction control section 37 determines the moving image data specified by the user from the list displayed on the display section 40 on the basis of the operation signal from the user interface section 33. Further, the reproduction control section 37 sets the determined moving image data to the moving image data to be reproduced. Further, the reproduction control section 37 sets a keyframe pass number KFS to "KFS=1." Then, the process proceeds to step ST23.

Note that the reproducible moving image data is not limited to the moving image data stored in the information storage section 32. For example, in the case where information (e.g., a URL (Uniform Resource Locator) and the like) regarding a provision destination for providing the moving image data through the communication path is evident, the moving image data capable of being acquired from the provision destination may be included in the reproducible moving image data. Further, in the case where the moving image data capable of being acquired from the provision destination is selected as the moving image data to be reproduced, the reproduction control section 37 controls the information acquisition section 31 to acquire the moving image data to be reproduced from the provision destination and the information storage section 32 to store the moving image data.

In step ST23, the reproducing apparatus acquires the image-related information. In the case where the image-related information associated with the moving image data to be reproduced is not stored in the information storage section 32, the reproduction control section 37 of the reproducing apparatus 30 controls the information acquisition section 31 to acquire the image-related information associated with the moving image data. The information acquisition section 31 allows the information storage section 32 to store the acquired image-related information. Then, the process proceeds to step ST24.

In step ST24, the reproducing apparatus determines whether the fast-forward operation is performed. If the reproduction control section 37 of the reproducing apparatus 30 determines that the fast-forward operation is not performed on the basis of the operation signal from the user interface section 33, the process proceeds to step ST25. Otherwise, if the reproduction control section 37 determines that the fast-forward operation is performed, the process proceeds to step ST26.

In step ST25, the reproducing apparatus 30 acquires the moving image data. The reproduction control section 37 of the reproducing apparatus 30 acquires the moving image data so that an image of the next frame can be displayed in the frame indicated by the reproduction position information stored in the reproduction position management section 35. Further, the reproduction control section 37 outputs the acquired moving image data to the decoding processing section 38. Then, the process proceeds to step ST30.

In step ST26, the reproducing apparatus acquires the attention position detection results. The reproduction control section 37 of the reproducing apparatus 30 acquires the attention position detection results from the attention position detection section 34. Then, the process proceeds to step ST27. Note that the detection of the attention position may be performed in the case where the fast-forward operation is performed and further may be always performed regardless of the fast-forward operation. As described below, for example, an image in a portion of an area from the image obtained by capturing a full celestial sphere is displayed on the display section such as a head-mounted display and an area of an image to be displayed in accordance with the direction of the head is moved. In this case, the attention position is detected regardless of the presence or absence of the fast-forward operation and the image in the direction of the attention position is displayed. Accordingly, in the case where the detection of the attention position is always performed, the reproducing apparatus 30 acquires the attention position detection results at the time when the fast-forward operation is performed.

In step ST27, the reproducing apparatus acquires the importance level. The reproduction control section 37 of the reproducing apparatus 30 acquires the importance level of the virtual division area corresponding to the attention position indicated by the attention position detection results from the area importance-level information of the image in which the detection of the attention position is performed on the basis of the image-related information. Then, the process proceeds to step ST28.

Figure 20:
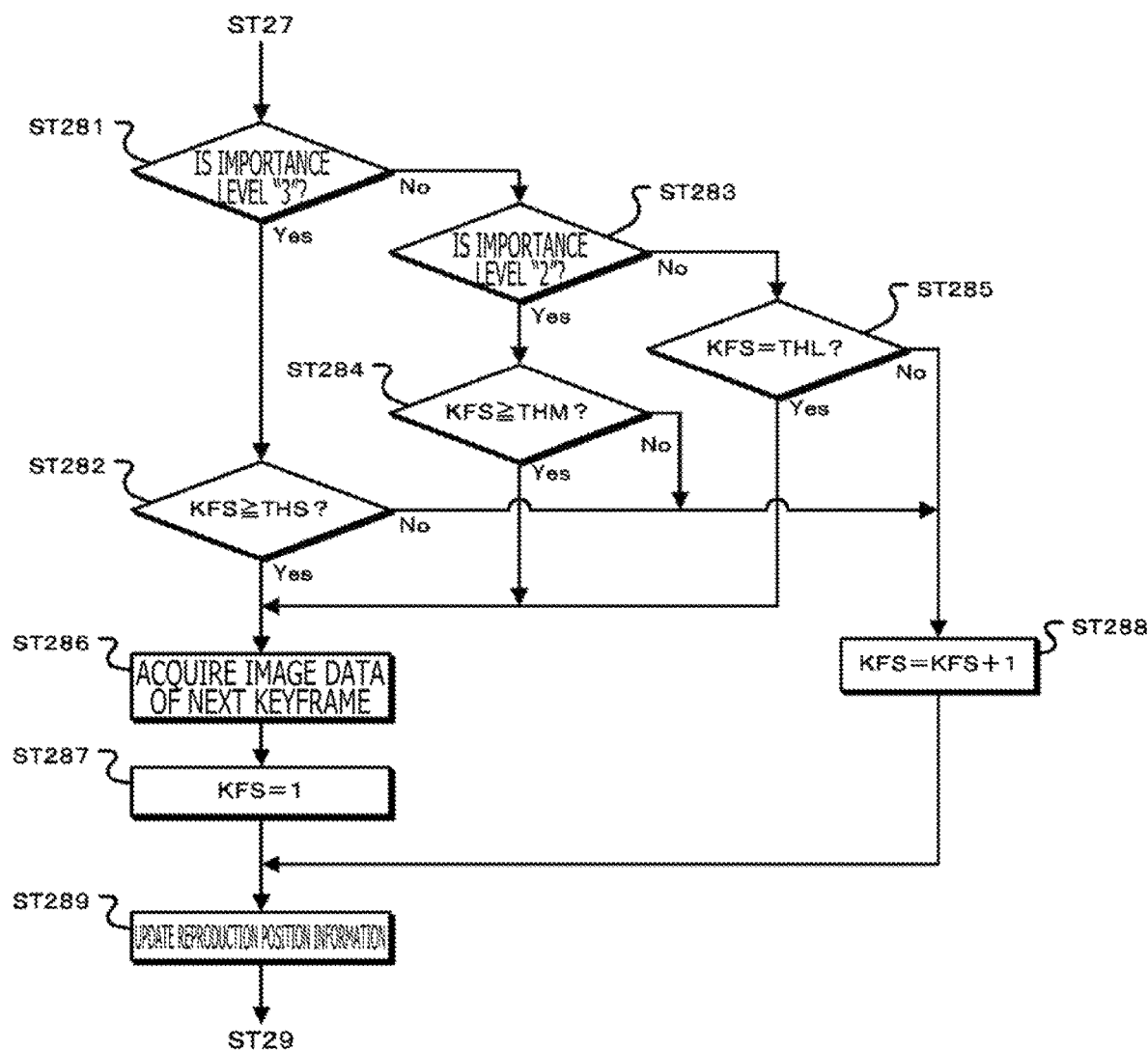
FIG. 20 is a flowchart illustrating an acquisition operation of keyframe image data according to the importance level.

In step ST28, the reproducing apparatus performs acquisition control of keyframe image data according to the importance level. The reproduction control section 37 of the reproducing apparatus 30 performs the operations of the flowchart illustrated in FIG. 20 and acquires the keyframe image data according to the importance level.

In step ST281, the reproduction control section determines whether the acquired importance level is "3." If the reproduction control section 37 determines that the acquired importance level is "3," the process proceeds to step ST282. Otherwise, if the reproduction control section 37 determines that the acquired importance level is not "3," the process proceeds to step ST283.

In step ST282, the reproduction control section determines whether the keyframe pass number KFS is equal to or greater than a frame interval "THS." If the reproduction control section 37 determines that the keyframe pass number KFS is equal to or greater than the frame interval "THS," the process proceeds to step ST286. Otherwise, if the reproduction control section 37 determines that the keyframe pass number KFS is smaller than the frame interval "THS," the process proceeds to step ST288.

When the process proceeds to step ST283 from step ST281, the reproduction control section determines whether the acquired importance level is "2." If the reproduction control section 37 determines that the acquired importance level is "2," the process proceeds to step ST284. Otherwise, if the reproduction control section 37 determines that the acquired importance level is not "2," the process proceeds to step ST285.

In step ST284, the reproduction control section determines whether the keyframe pass number KFS is equal to or greater than a keyframe reproduction interval "THM." If the reproduction control section 37 determines that the keyframe pass number KFS is equal to or greater than the frame interval "THM," the process proceeds to step ST286. Otherwise, if the reproduction control section 37 determines that the keyframe pass number KFS is smaller than the frame interval "THM," the process proceeds to step ST288.

When the process proceeds to step ST285 from step ST283, the reproduction control section determines whether the keyframe pass number KFS is equal to the frame interval "THL." If the reproduction control section 37 determines that the keyframe pass number KFS is equal to the frame interval "THL," the process proceeds to step ST286. Otherwise, if the reproduction control section 37 determines that the keyframe pass number KFS is different from the frame interval "THL," the process proceeds to step ST288.

In step ST286, the reproduction control section acquires the next keyframe image data. The reproduction control section 37 acquires the next keyframe image data that has the keyframe reproduction interval according to the importance level from the information storage section 32. Then, the process proceeds to step ST287.

In step ST287, the reproduction control section sets the keyframe pass number KFS to "KFS=1." Then, the process proceeds to step ST289 illustrated in FIG. 19.

In step ST288, the reproduction control section updates the keyframe pass number KFS to "KFS=KFS+1." Then, the process proceeds to step ST289.

In step ST289, the reproduction control section updates the reproduction position information. Each time performing the process of step ST28, a position of the keyframe as a candidate of the data readout is updated to a time direction. Accordingly, the reproduction control section 37 allows the reproduction position management section 35 to store the reproduction position information according to a position of the updated keyframe. Then, the process proceeds to step ST29 illustrated in FIG. 19.

FIG. 21 illustrates a relationship between the importance level of the virtual division area corresponding to the attention position and the keyframe in which the image data is acquired. Note that FIG. 21 illustrates a case of "THL=3, THM=2, and THS=1." In the case in which the importance level is "3," when the keyframe pass number KFS is "KFS=1," the keyframe image data is acquired. That is, in the reproducing apparatus, data of the keyframes KF1 to KF10 is acquired in sequence. Further, in the case in which the importance level is "2," when the keyframe pass number KFS is "KFS=2," the keyframe image data is acquired. That is, in the reproducing apparatus, processing in which the keyframe image data is acquired at an interval of one keyframe is performed. For example, the data of the keyframes KF1, KF3, KF5, KF7, and KF9 is acquired in sequence. Further, in the case in which the importance level is "1," when the keyframe pass number KFS is "KFS=3," the keyframe image data is acquired. That is, in the reproducing apparatus, processing in which the keyframe image data is acquired at an interval of two keyframes is performed. For example, the data of the keyframes KF1, KF4, KF7, and KF10 is acquired in sequence.

Figure 22:
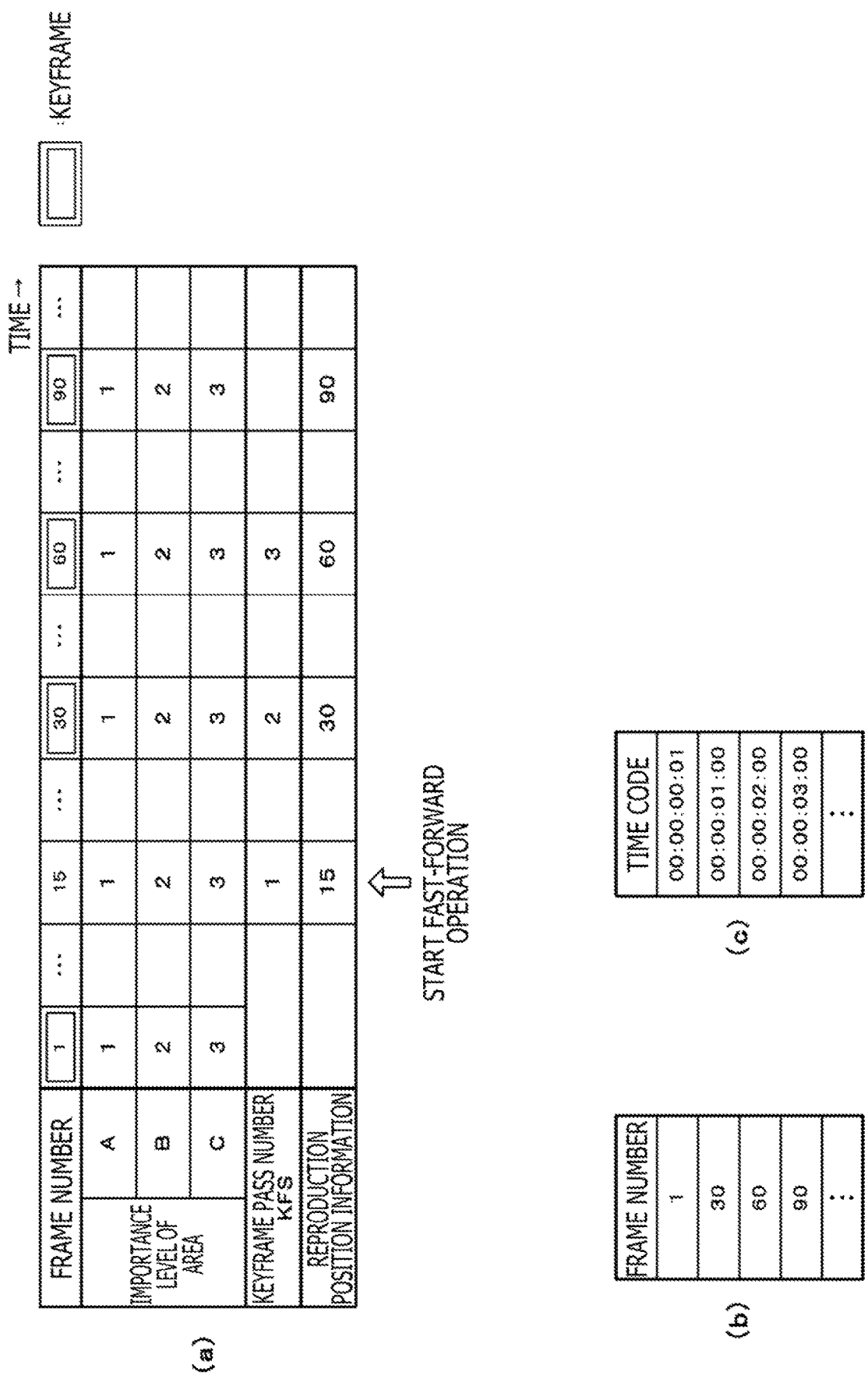
FIG. 22 is a diagram illustrating the acquisition operation of the keyframe image data according to the importance level.

FIG. 22 illustrates an acquisition operation of the keyframe image data according to the importance level. FIG. 22(a) illustrates the importance level for each frame in the areas "A," "B," and "C" in order of time. Further, FIG. 22(a) illustrates the keyframe pass number KFS and the previously decoded frame number. FIG. 22(b) is a keyframe table and illustrates the frame number of the keyframe. Note that the keyframe table may indicate the time code of the keyframe as illustrated in FIG. 22(c).

In the reproducing apparatus, for example, the fast-forward operation is assumed to be performed at the time of reproducing the frame number "15." In this case, in the reproducing apparatus, when the attention position is the area "A," the importance level of the area "A" is "1." Therefore, the reproducing apparatus thins the keyframe image data having the frame numbers "30" and "60" on the basis of the keyframe table and acquires the keyframe image data having the frame number "90."

Further, in the reproducing apparatus, when the attention position is the area "B," the importance level of the area "B" is "2." Therefore, the reproducing apparatus thins the keyframe image data having the frame number "30" and acquires the keyframe image data having the frame number "60." Further, in the reproducing apparatus, if the frame number is "30" and the attention position is the area "C," the importance level of the area "C" is "3." Therefore, the reproducing apparatus acquires the keyframe image data having the frame number "30" of the keyframe that is nearest in the temporal passage direction.

Further, the reproducing apparatus updates the reproduction position information in accordance with the updating of a position of the keyframe. When the keyframe pass number KFS is, for example, "KFS=2," the reproducing apparatus stores the frame number "30" as the reproduction position information. When the keyframe pass number KFS is, for example, "KFS=3," the reproducing apparatus stores the frame number "60" as the reproduction position information. As described above, by updating the reproduction position information, even if the fast-forward operation ends before the next keyframe image data is acquired, the reproducing apparatus allows the reproduction position to be advanced. For example, when the fast-forward operation ends before the keyframe image data having the frame number "90" is acquired, the reproducing apparatus allows the reproduction operation to be started at the ordinary speed from the next frame of the frame number "30" or the frame number "60" in which a time advances as compared with the frame number "15."

In step ST29, the reproducing apparatus determines whether the keyframe image data has been acquired. In the case where the keyframe image data is acquired in step ST28, the reproduction control section 37 of the reproducing apparatus 30 outputs the acquired data to the decoding processing section 38. Further, the reproduction control section 37 allows the reproduction position management section 35 to store the reproduction position information regarding data to be processed by the decoding processing section 38. Then, the process proceeds to step ST30. As illustrated in FIG. 22(*a*), for example, in the case where the attention position is the area "A" when the fast-forward operation is performed at the time of reproducing the frame number "15," the reproduction control section 37 allows the reproduction position management section 35 to store the frame number "90" of the acquired data as the reproduction position information. Otherwise, if the reproduction control section 37 has not acquired the keyframe image data, the process returns to step ST24.

In step ST30, the reproducing apparatus 30 performs the decoding processing. The decoding processing section 38 of the reproducing apparatus 30 performs the decoding processing on the moving image data acquired in step ST25 or the keyframe image data acquired in step ST28. Further, the decoding processing section 38 outputs the image data of one frame of the reproduction image. Then, the process proceeds to step ST31.

In step ST31, the reproducing apparatus determines whether the reproduction ends. The reproduction control section 37 of the reproducing apparatus 30 determines whether a reproduction end operation is performed by the user interface section 33 or the reproduction of the moving image data is performed until the end. If the reproduction control section 37 determines that the reproduction end operation and the reproduction of the moving image data are not performed until the end, the process returns to step ST24. Otherwise, if the reproduction control section 37 determines that the reproduction end operation is performed, or that the reproduction of the moving image data is performed until the end, the reproduction operation ends.

Figure 23:
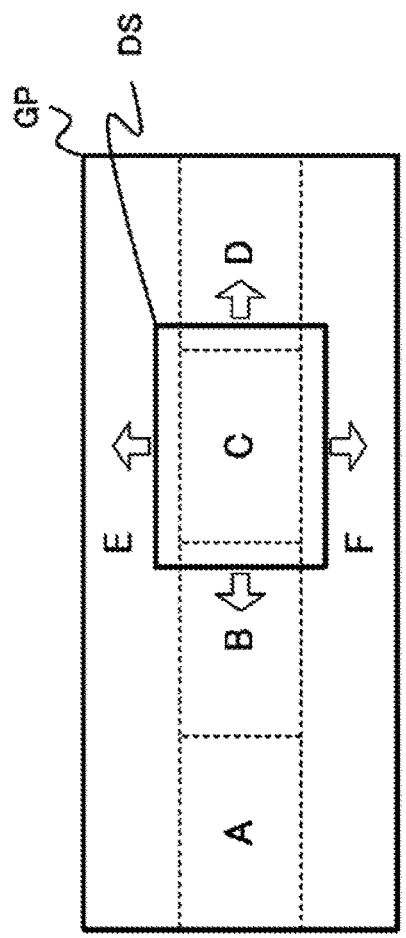
FIG. 23 is a diagram describing a case in which only a portion of the image indicated by moving image data is displayed.

If such processing as described above is performed in a case where a fast-forward operation is performed, for example, a fast-forward speed can be changed in accordance with the importance level of the virtual division area to which the user pays attention. Therefore, in the case where only a portion of the image indicated by the moving image data is displayed, for example, as illustrated in FIG. 23, in a case where a display size in the display section such as the head-mounted display is small as compared with an image GP obtained by capturing the full celestial sphere and a display area DS is moved in accordance with the direction of the head, even if a switching operation of the fast-forward speed is not performed by using a remote control apparatus etc., the direction of the head is moved to the virtual division area with a low importance level and thereby the image in the display area corresponding to the direction of the head can be reproduced at a fast speed. Further, the direction of the head is moved to an area with a high importance level, and thereby the image in the display area corresponding to the direction of the head can be reproduced at a speed lower than that in the case the head is directed to an area with a low importance level.

Further, in the case where the line-of-sight direction is detected, the line of sight is moved to the area with a low importance level to thereby make the fast-forward speed high. By contrast, the line of sight is moved to the area with a high importance level to thereby make the fast-forward speed lower as compared with a case in which the line of sight is moved to the area with a low importance level.

Note that not only in the case in which only a portion of the image is displayed on the display section but also in the case in which the entire image is displayed on the display section, the image of the moving image data may be displayed. Further, the frame interval of each importance level may be set in advance or may be performed so as to be set or changed by the user. Further, when the interval of the keyframe that is a reproduction candidate can be changed, the reproduction speed can be collectively changed in accordance with each importance level. Further, when the reproduction of the keyframe is performed in the reverse time direction, a speed of a rewinding operation can be changed in accordance with the importance level of the attention position.

As described above, in the reproducing apparatus, the reproduction operation is controlled in accordance with the importance level of the virtual division area corresponding to the attention position on the basis of the image-related information associated with the moving image data. Therefore, the direction of the head or the line-of-sight direction is moved, and thereby an appropriate reproduction operation can be easily performed.

<5. Other Operations of Reproducing Apparatus>

Next, other operations of the reproducing apparatus will be described. The reproducing apparatus may control the decoding processing in accordance with the importance level of the virtual division area corresponding to the attention position. For example, the decoding processing is performed in an area with a high importance level and, in the case where the importance level is low, the partial decoding processing is performed. Alternatively, in the case where the importance level is low, the decoding processing may not be performed. The reproducing apparatus controls the decoding processing in accordance with the importance level to thereby perform the decoding processing effectively.

In the partial decoding processing, the decoding processing may be performed in a portion of the area. Alternatively, the reproduction image with a low resolution may be generated through simplification of the decoding processing. In an encoding system of JPEG 2000 etc., for example, the image is divided into tiles and the encoding processing is performed in each tile. Further, in the encoding processing for each tile, a sub-band division is performed by a wavelet transformation. Therefore, the reproducing apparatus performs a selection of the tiles, for example, on the basis of the attention position and performs the decoding processing on the selected tiles. Further, a portion of the sub-band is selectively used to thereby simplify the decoding processing. Such partial decoding processing is performed, and thereby a load required for the decoding processing can be alleviated in the reproducing apparatus.

Further, in the image-related information used in the reproducing apparatus, the importance level assigned to the virtual division area in each image is indicated. Therefore, when the information display area is set to the virtual division area with a low importance level and various pieces of information, for example, the image such as supplementary information regarding the moving image data, the menu, the GUI, or an advertisement are superimposed on the image of the moving image data to be displayed, the reproduction control section can prevent an image with a high importance level from being hidden. Further, when the information display area is set to the virtual division area with a high importance level, an attention degree can be made high against information displayed in the information display area and, for example, an advertisement etc. can be effectively performed.

Further, in the case where the area subject information is included in the image-related information, the reproduction control section may display a GUI image as illustrated in FIG. 24 in which the time, the virtual division area, and the area subject information included in the virtual division area are tabulated. Further, the reproduction control section may control the reproduction operation of the moving image data in accordance with a user selection result in the displayed time and virtual division area. For example, the reproduction control section reproduces the moving image data, with an image of the time and virtual division area selected by the user set to a predetermined position (e.g., a front position). When such a reproduction operation is performed, the subject to be desired by the user can be set to the predetermined position from the time to be desired by the user and the reproduction operation can be performed. Further, in the case where the attention position of the user and a position of the selected virtual division area are different from each other, a proposition of the position in the selected virtual division area may be performed to the attention position. For example, the reproduction control section forms a navigate display such as an arrow indicating a direction in which the selected virtual division area is located. Such a navigate display is formed and the user moves the attention position on the basis of the navigate display to thereby view an image of the selected virtual division area.

Further, in the case where the area subject information is included in the image-related information, the reproduction control section may determine the virtual division area corresponding to the attention position detected by the attention position detection section. Further, the reproduction control section may display the area subject information indicating the subject included in the determined virtual division area. For example, in the case where the area subject information is included as illustrated in FIG. 24, information regarding an "actor C" is displayed in the case where the attention position of the user is the virtual division area of the division area ID "B" at the time of reproducing the image of the time code "00:30:00:00." Note that the area subject information may be superimposed on the reproduction image based on the moving image data to be displayed or may be displayed in the display area different from that of the reproduction image.

Further, the reproduction control section may determine the virtual division area in which the desired subject is included on the basis of the area subject information. Further, the reproduction control section may control the reproduction operation of the moving image data on the basis of the determination result. For example, the reproduction control section selects the virtual division area including the subject selected by the user. Further, the reproduction control section sets the reproduction speed of the special reproduction operation in accordance with the importance level assigned to the selected virtual division area. In this case, the reproducing apparatus may reproduce the moving image data, with the display image in the virtual division area including the subject selected by the user set to the predetermined position. In addition, in the case where the attention position of the user and the position in the selected virtual division area are different from each other, the reproducing apparatus may perform proposition of the position in the selected virtual division area to the attention position as described above. When such a reproduction operation is performed, the subject selected by the user can be displayed at the time of the special reproduction operation. Further, the reproduction speed at the time of the special reproduction operation can be controlled in accordance with the importance level of the virtual division area including the subject selected by the user.

Further, the reproducing apparatus stores, as a reproduction operation history, the time transition and operation history of the virtual division area corresponding to the attention position of the user at the time of the reproduction operation. Further, the reproducing apparatus displays the reproduction operation history along with the image-related information. As described above, when the reproduction operation history is displayed along with the image-related information, for example, the user can easily determine that an attention is paid to what kind of subject to perform the reproduction. FIG. 25 illustrates a case in which the reproduction operation history is superimposed on the image-related information to be displayed. The user performs the reproduction operation from a time t1 to a time t4, with the virtual division area in which the division area ID is "C" set to the attention position. Then, the user performs the fast-forward operation, with the virtual division area in which the division area ID is "E" set to the attention position. Further, the user performs the reproduction operation at the ordinary speed, with the virtual division area in which the division area ID is "A" at a time t6 set to the attention position. Further, the user ends the reproduction operation, with the virtual division area in which the division area ID is "C" at a time t10 set to the attention position. Note that a temporary stop operation is performed at a time t7. As described above, it is obvious that in the case of FIG. 25, when the reproduction operation history is displayed along with the image-related information, the user performs the reproduction operation so that an image of an "actor B" is displayed.

Further, the reproducing apparatus stores the reproduction operation history so as to be reused to thereby reproduce the reproduction operation of the past. Further, in the case where the reproduction operation of the past is reproduced by using the reproduction operation history, if the image in the virtual division area corresponding to the attention position is controlled to be displayed at the predetermined position, the display position in the reproduction operation can be controlled so that the desired subject exists in the predetermined position. For example, in the case of using the reproduction operation history illustrated in FIG. 25, the reproduction operation can be performed so that the image in the virtual division area including the "actor B" exists in the front position.

The series of processes described in the specification can be performed by hardware, software, or a combination thereof. In the case where the series of processes are performed by software, a program having a processing sequence recorded therein can be executed by installing the program to a memory in a computer built into dedicated hardware. Alternatively, the program can be executed by installing it to a general-purpose computer capable of performing various processing tasks.

The program can be recorded in advance, for example, in a hard disk, an SSD (Solid State Drive), or a ROM (Read Only Memory) as a recording medium. Alternatively, the program can be temporarily or permanently stored (recorded) in a removable recording medium such as a flexible disk, a CD-ROM (Compact Disc Read Only Memory), an MO (Magneto optical) disc, a DVD (Digital Versatile Disc), a BD (Blu-Ray Disc (registered trademark)), a magnetic disk, or a semiconductor memory card. Such a removable recording medium can be provided as so-called package software.

Further, the programs may be installed from the removable recording medium to a computer, and in addition, the programs may be transferred wirelessly or by wire from a download site to a computer via a network such as a LAN (Local Area Network) or the Internet. The computer can receive the program transferred as described above and install the program in a recording medium such as a built-in hard disk.

It should be noted that the effects described in the present specification are merely illustrative and are not limitative and that there may be additional effects that are not described in the present specification. Further, the present technology should not be construed as a limitation to the embodiments of the above-described technology. Embodiments of the technology disclose the present technology in the form of illustration, and it is obvious that those skilled in the art can make modifications and substitutions of the embodiments without departing from the gist of the present technology. That is, in order to determine the gist of the present technology, the claims should be examined.

In addition, the reproducing apparatus according to the present technology can have the following configurations.

(1)

A reproducing apparatus including:

an attention position detection section configured to detect an attention position of a user to a reproduction image of moving image data; and a reproduction control section configured to determine an importance level of a virtual division area corresponding to the attention position detected by the attention position detection section on the basis of image-related information associated with the moving image data indicating a position and importance level of the virtual division area in which the reproduction image is virtually divided and control a reproduction operation of the moving image data in accordance with the determined importance level.

(2)

The reproducing apparatus according to (1) above, in which the image-related information indicates the position and importance level of the virtual division area in each time by using time information regarding the reproduction image, and the reproduction control section sets a next reproduction image in accordance with the determined importance level by using the time information.

(3)

The reproducing apparatus according to (2) above, in which the reproduction control section sets the next reproduction image so that as the importance level becomes lower, an image that is thinned in the reproduction operation is more present.

(4)

The reproducing apparatus according to (1) above, in which the moving image data is encoded data, and the reproduction control section controls decoding processing of the moving image data in accordance with the importance level.

(5)

The reproducing apparatus according to any one of (1) to (4) above, in which the reproduction control section sets an information display area to an image display area corresponding to the virtual division area with a low importance level.

(6)

The reproducing apparatus according to any one of (1) to (5) above, in which the image-related information indicates the position and importance level of the virtual division area and area subject information regarding a subject included in the virtual division area in each time by using time information regarding the reproduction image, and the reproduction control section associates a time, the subject, and the virtual division area on the basis of the image-related information to be displayed on a display section and controls the reproduction operation of the moving image data in accordance with a user selection result to the time and the virtual division area.

(7)

The reproducing apparatus according to any one of (1) to (6) above, in which the image-related information includes the area subject information regarding the subject included in the virtual division area, and the reproduction control section determines the virtual division area corresponding to the attention position detected by the attention position detection section and displays the area subject information indicating the subject included in the determined virtual division area.

(8)

The reproducing apparatus according to any one of (1) to (6) above, in which the image-related information includes the area subject information regarding the subject included in the virtual division area, and the reproduction control section determines the virtual division area in which a desired subject is included on the basis of the area subject information and controls the reproduction operation of the moving image data on the basis of a determination result.

(9)

The reproducing apparatus according to (8) above, in which in the case where the virtual division area in which the desired subject is included and the virtual division area corresponding to the attention position are different from each other, the reproduction control section proposes a position of the virtual division area in which the desired subject is included.

(10)

The reproducing apparatus according to any one of (1) to (9) above, in which the reproduction control section allows the display section to display a reproduction operation history of the moving image data along with the image-related information.

(11)

The reproducing apparatus according to any one of (1) to (10) above, in which the reproduction control section stores the reproduction operation history of the moving image data reusably and, in the case where the moving image data is reproduced on the basis of the reproduction operation history, sets the virtual division area corresponding to the attention position to a predetermined position in the reproduction image.

(12)

The reproducing apparatus according to any one of (1) to (11) above, in which the attention position detection section includes a sensor that detects a direction of a head or a line-of-sight direction of the user who views the reproduction image and sets the direction of the head or a position of the line-of-sight direction to the reproduction image determined on the basis of a detection result of the sensor to the attention position.

Further, the information generation apparatus according to the present technology can have the following configurations.

(1)

An information generation apparatus including:

an image-related information generation section configured to set an importance level to each virtual division area in which an image of moving image data is virtually divided and generate image-related information indicating a position and importance level of the virtual division area in the image in association with the moving image data.

(2)

The information generation apparatus according to (1) above, in which the image-related information generation section generates the image-related information so as to indicate a position and importance level of the virtual division area in each time by using time information added to the image.

(3)

The information generation apparatus according to (2) above, in which the image-related information generation section sets the importance level on the basis of a processing result of image processing set to the virtual division area.

(4)

The information generation apparatus according to (3) above, in which the image-related information generation section sets the importance level on the basis of the processing result of a plurality of image processing with the image processing set in plurality to the virtual division area.

(5)

The information generation apparatus according to any one of (1) to (4) above, in which the image-related information generation section includes area subject information regarding a subject included in the virtual division area in the image-related information.

(6)

The information generation apparatus according to any one of (1) to (5), in which the image-related information generation section performs specific area recognition processing by using the image and virtually divides the image on the basis of a recognition processing result.

INDUSTRIAL APPLICABILITY

According to the reproducing apparatus, the reproducing method, the information generation apparatus, and the information generation method of the technology, the attention position of the user to the reproduction image of the moving image data is detected by using the attention position detection section. Further, the importance level of the virtual division area corresponding to the attention position detected by the attention position detection section is determined and the reproduction operation of the moving image data is controlled in accordance with the determined importance level by using the reproduction control section on the basis of the image-related information associated with the moving image data indicating the position and importance level of the virtual division area in which the reproduction image is virtually divided. Therefore, the user can control the reproduction operation only by moving the attention position and easily perform the appropriate reproduction operation. Therefore, the reproducing apparatus of the technology is appropriate for a reproducing apparatus that displays the reproduction image on the display section worn on the head, a reproducing apparatus that reproduces a moving image of a wide field angle, or the like.

REFERENCE SIGNS LIST

10 . . . Image processing system
20, 20a . . . Information generation apparatus
21 . . . Division area setting section
22 . . . Division area information storage section
23 . . . Importance-level setting control section
24 . . . Importance-level division area setting control section
25, 25a . . . Image-related information generation section
30 . . . Reproducing apparatus
31 . . . Information acquisition section
32 . . . Information storage section
33 . . . User interface section
34 . . . Attention position detection section
35 . . . Reproduction position management section
36 . . . Operation setting information storage section
37 . . . Reproduction control section
38 . . . Decoding processing section
39 . . . Information display processing section
40 . . . Display section

The invention claimed is:

1. A reproducing apparatus comprising:
an attention position detection section configured to detect an attention position of a user to a reproduction image of moving image data; and
a reproduction control section configured to determine an importance level of a virtual division area corresponding to the attention position detected by the attention position detection section on a basis of image-related information associated with the moving image data indicating a position and importance level of the virtual division area in which the reproduction image is virtually divided and control a reproduction operation of the moving image data in accordance with the determined importance level,
wherein the reproduction control section is further configured to control the reproduction operation of the moving image data in accordance with movement of the detected attention position of the user in relation to the reproduction image of the moving image data,
wherein the reproduction control section controls a speed of reproducing images of the moving image data to be increased when the attention position of the user is detected to have moved to a virtual division area having a lower importance level,
wherein the virtual division area is set to the reproduction image of the moving image data and represents a planar portion of the reproduction image that is smaller than a whole of the reproduction image, and
wherein the attention position detection section and the reproduction control section are each implemented via at least one processor.

2. The reproducing apparatus according to claim 1, wherein the image-related information indicates the position and importance level of the virtual division area in each time by using time information regarding the reproduction image, and the reproduction control section sets a next reproduction image in accordance with the determined importance level by using the time information.

3. The reproducing apparatus according to claim 2, wherein the reproduction control section sets the next reproduction image so that as the importance level becomes lower, an image that is thinned in the reproduction operation is more present.

4. The reproducing apparatus according to claim 1, wherein the moving image data is encoded data, and the reproduction control section controls decoding processing of the moving image data in accordance with the importance level.

5. The reproducing apparatus according to claim 1, wherein the reproduction control section sets an information display area to an image display area corresponding to the virtual division area with a low importance level.

6. The reproducing apparatus according to claim 1, wherein the image-related information indicates the position and importance level of the virtual division area and area subject information regarding a subject included in the virtual division area in each time by using time information regarding the reproduction image, and the reproduction control section associates a time, the subject, and the virtual division area on a basis of the image-related information to be displayed on a display section and controls the reproduction operation of the moving image data in accordance with a user selection result to the time and the virtual division area.

7. The reproducing apparatus according to claim 1, wherein the image-related information includes the area subject information regarding a subject included in the virtual division area, and the reproduction control section determines the virtual division area corresponding to the attention position detected by the attention position detection section and displays the area subject information indicating the subject included in the determined virtual division area.

8. The reproducing apparatus according to claim 1, wherein the image-related information includes the area subject information regarding a subject included in the virtual division area, and the reproduction control section determines the virtual division area in which a desired subject is included on a basis of the area subject information and controls the reproduction operation of the moving image data on a basis of a determination result.

9. The reproducing apparatus according to claim 8, wherein in a case where the virtual division area in which the desired subject is included and the virtual division area corresponding to the attention position are different from each other, the reproduction control section proposes a position of the virtual division area in which the desired subject is included.

10. The reproducing apparatus according to claim 1, wherein the reproduction control section allows the display section to display a reproduction operation history of the moving image data along with the image-related information.

11. The reproducing apparatus according to claim 1, wherein the attention position detection section includes a sensor that detects a direction of a head or a line-of-sight direction of the user who views the reproduction image and sets the direction of the head or a position of the line-of-sight direction to the reproduction image determined on a basis of a detection result of the sensor to the attention position.

12. The reproducing apparatus according to claim 1, wherein the virtual division area is set to each image of the moving image data, and in each respective image of the moving image data, the virtual division area represents a portion of the respective image that is smaller than a whole of the respective image.

13. The reproducing apparatus according to claim 1, wherein the virtual division area is an area surrounded by area coordinates located within a plane of the image.

14. A reproducing apparatus comprising:

an attention position detection section configured to detect an attention position of a user to a reproduction image of moving image data; and a reproduction control section configured to determine an importance level of a virtual division area corresponding to the attention position detected by the attention position detection section on a basis of image-related information associated with the moving image data indicating a position and importance level of the virtual division area in which the reproduction image is virtually divided and control a reproduction operation of the moving image data in accordance with the determined importance level, wherein the reproduction control section stores the reproduction operation history of the moving image data reusably and, in a case where the moving image data is reproduced on a basis of the reproduction operation history, sets the virtual division area corresponding to the attention position to a predetermined position in the reproduction image, and wherein the attention position detection section and the reproduction control section are each implemented via at least one processor.

15. A reproducing method comprising:

detecting an attention position of a user to a reproduction image of moving image data by using an attention position detection section; and determining an importance level of a virtual division area corresponding to the attention position detected by using the attention position detection section and controlling a reproduction operation of the moving image data in accordance with the determined importance level by using a reproduction control section on a basis of image-related information associated with a position of the virtual division area in which the reproduction image is virtually divided and the moving image data indicating the importance level of the virtual division area, wherein the reproduction operation of the moving image data is further controlled by the reproduction control section in accordance with movement of the detected attention position of the user in relation to the reproduction image of the moving image data, wherein a speed of reproducing images of the moving image data is controlled by the reproduction control section to be increased when the attention position of the user is detected to have moved to a virtual division area having a lower importance level, wherein the virtual division area is set to the reproduction image of the moving image data and represents a planar portion of the reproduction image that is smaller than a whole of the reproduction image.

16. An information generation apparatus comprising:
an image-related information generation section configured to
perform specific area recognition processing by using an image of moving data,
virtually divide the image into a plurality of virtual division areas on a basis of a result of the performed specific area recognition processing,
set an importance level to each virtual division area of the plurality of virtual division areas, the importance level being set for controlling a reproduction operation of the moving image data in accordance with an attention position of a user to the image of the moving image data, and
generate image-related information indicating a position and importance level of the virtual division area in the image in association with the moving image data,
wherein the reproduction operation of the moving image data is further controlled in accordance with detection of movement of the attention position of the user in relation to a reproduction image of the moving image data,
wherein a speed of reproducing images of the moving image data is controlled to be increased when the attention position of the user is detected to have moved to a virtual division area having a lower importance level,
wherein the virtual division areas are set to the image of the moving image data and represent unique planar portions of the reproduction image that are each smaller than a whole of the reproduction image, and
wherein the image-related information generation section is implemented via at least one processor.

17. The information generation apparatus according to claim 16, wherein
the image-related information generation section generates the image-related information so as to indicate a position and importance level of the virtual division area in each time by using time information added to the image.

18. The information generation apparatus according to claim 16, wherein
the image-related information generation section sets the importance level on a basis of a processing result of image processing set to the virtual division area.

19. The information generation apparatus according to claim 18, wherein
the image-related information generation section sets the importance level on a basis of the processing result of a plurality of image processing with the image processing set in plurality to the virtual division area.

20. The information generation apparatus according to claim 16, wherein
the image-related information generation section includes area subject information regarding a subject included in the virtual division area in the image-related information.

21. An information generation method comprising:
performing specific area recognition processing by using an image of moving data;
virtually dividing the image into a plurality of virtual division areas on a basis of a result of the performed specific area recognition processing;
setting an importance level to each virtual division area of the plurality of virtual division areas, the importance level being set for controlling a reproduction operation of the moving image data in accordance with an attention position of a user to the image of the moving image data; and
generating image-related information indicating a position and importance level of the virtual division area in the image in association with the moving image data,
wherein the reproduction operation of the moving image data is further controlled in accordance with detection of movement of the attention position of the user in relation to a reproduction image of the moving image data,
wherein a speed of reproducing images of the moving image data is controlled to be increased when the attention position of the user is detected to have moved to a virtual division area having a lower importance level, and
wherein the virtual division areas are set to the image of the moving image data and represent unique planar portions of the reproduction image that are each smaller than a whole of the reproduction image.

* * * * *